(12) United States Patent
Momchilov et al.

(10) Patent No.: US 11,474,840 B1
(45) Date of Patent: Oct. 18, 2022

(54) COMPUTING DEVICE AND RELATED METHODS PROVIDING VIRTUAL SESSION LAUNCHING FROM PREVIOUSLY CACHED ASSETS

(71) Applicant: CITRIX SYSTEMS, INC., Fort Lauderdale, FL (US)

(72) Inventors: Georgy Momchilov, Parkland, FL (US); Hubert Divoux, Parkland, FL (US); Santosh Gummunur Chiranjeevi Sampath, Karnataka (IN); Deepak Sharma, Karnataka (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 17/447,838

(22) Filed: Sep. 16, 2021

Related U.S. Application Data

(60) Provisional application No. 63/189,380, filed on May 17, 2021.

(51) Int. Cl.
| | | |
|---|---|---|
| *G06F 15/16* | (2006.01) | |
| *G06F 9/451* | (2018.01) | |
| *G06F 16/958* | (2019.01) | |
| *G06F 16/957* | (2019.01) | |
| *H04L 65/401* | (2022.01) | |

(52) U.S. Cl.
CPC ............ *G06F 9/452* (2018.02); *G06F 16/958* (2019.01); *G06F 16/9574* (2019.01); *H04L 65/401* (2022.05)

(58) Field of Classification Search
None
See application file for complete search history.

(56) References Cited

U.S. PATENT DOCUMENTS

| | | |
|---|---|---|
| 8,014,421 B2 | 9/2011 | Rao et al. |
| 8,132,247 B2 | 3/2012 | Adhya et al. |
| 8,451,806 B2 | 5/2013 | Kumar et al. |
| 9,009,327 B2 | 4/2015 | Adhya et al. |
| 9,154,328 B2 | 10/2015 | Suganthi et al. |
| 9,690,954 B2 | 6/2017 | Nord et al. |
| 9,800,669 B2 | 10/2017 | Bell |
| 9,805,210 B2 | 10/2017 | Nord et al. |
| 11,310,034 B2 * | 4/2022 | Huang .................... H04L 63/08 |
| 2019/0098095 A1 | 3/2019 | Innes |
| 2019/0132381 A1 | 5/2019 | Momchilov et al. |

(Continued)

FOREIGN PATENT DOCUMENTS

WO WO2011050074 4/2011

OTHER PUBLICATIONS

U.S. Appl. No. 16/992,393, filed Aug. 13, 2020 Momchilov et al.

*Primary Examiner* — Quang N Nguyen
(74) *Attorney, Agent, or Firm* — Allen, Dyer, Doppelt + Gilchrist, PA

(57) ABSTRACT

A computing device may include a memory and a processor configured to cooperate with the memory to run a browser configured to perform a sequence to obtain an asset and display a user interface for launching a virtual session using the asset. The processor may further run code configured to determine a failure of the browser to complete the sequence, and cause the browser to display the user interface for launching the virtual session using a previously cached version of the asset responsive to the failure of the browser to complete the sequence.

15 Claims, 15 Drawing Sheets

(56) References Cited

U.S. PATENT DOCUMENTS

2020/0371829 A1* 11/2020 Momchilov ........ G06F 9/45558
2020/0374351 A1* 11/2020 Momchilov .......... H04L 67/142
2022/0050699 A1    2/2022 Momchilov et al.

* cited by examiner

COMPUTING DEVICE AND RELATED METHODS PROVIDING VIRTUAL SESSION LAUNCHING FROM PREVIOUSLY CACHED ASSETS

RELATED APPLICATIONS

This application claims the benefit of provisional application Ser. No. 63/189,380 filed May 17, 2021, which is hereby incorporated herein in its entirety by reference.

BACKGROUND

Many organizations are now using applications to provide a more flexible option to address the varying needs of their users. In desktop virtualization, a user's operating system, applications, and/or user settings may be separated from the user's physical smartphone, laptop, or desktop computer. Using client-server technology, a "virtualized desktop" may be stored in and administered by a remote server, rather than in the local storage of a client computing device.

There are several different types of desktop virtualization systems. Virtual Desktop Infrastructure (VDI) refers to the process of running a user desktop inside a virtual machine that resides on a server. Virtualization systems may also be implemented in a cloud computing environment in which a pool of computing desktop virtualization servers, storage disks, networking hardware, and other physical resources may be used to provision virtual desktops, and/or provide access to shared applications.

SUMMARY

A computing device may include a memory and a processor configured to cooperate with the memory to run a browser configured to perform a sequence to obtain an asset and display a user interface for launching a virtual session using the asset. The processor may further run code configured to determine a failure of the browser to complete the sequence, and cause the browser to display the user interface for launching the virtual session using a previously cached version of the asset responsive to the failure of the browser to complete the sequence.

In an example embodiment, the code may be configured to determine initiation of the sequence based upon an address loaded by the browser, and the code may determine the failure of the browser to complete the sequence responsive to determining initiation of the sequence. In accordance with another example, the browser may be configured to perform the sequence at a first Web page and display a second Web page in the user interface for launching the virtual session, and the code may be configured to redirect the browser to the second Web page responsive to determining the failure of the browser to complete the sequence.

In some embodiments, the code may be configured to cause the browser to display an input element, and detect the failure of the browser to complete the sequence based upon the input element. By way of example, the input element may comprise a cancel button. In another embodiment, the code may be configured to detect the failure of the browser to complete the sequence based upon a timeout period.

By way of example, the asset may comprise a connection lease. Also by way of example, the sequence may comprise an authentication sequence. Furthermore, the virtual session may comprise at least one of an application session and a microapp session, for example.

A related method may include running a browser at a computing device configured to perform a sequence to obtain an asset and display a user interface for launching a virtual session using the asset. The method may further include running code at the computing device configured to determine a failure of the browser to complete the sequence, and cause the browser to display the user interface for launching the virtual session using a previously cached version of the asset responsive to the failure of the browser to complete the sequence.

A related non-transitory computer-readable medium may have computer-executable instructions for causing a computing device to perform steps including running a browser configured to perform a sequence to obtain an asset and display a user interface for launching a virtual session using the asset. A further step may include running code configured to determine a failure of the browser to complete the sequence, and cause the browser to display the user interface for launching the virtual session using a previously cached version of the asset responsive to the failure of the browser to complete the sequence.

DETAILED DESCRIPTION

One approach to connecting user computing devices to virtual sessions involves connection leases, which provide long-lived and mostly static entitlements to published resources the users are entitled to access. This not only makes the connection lease secure, it also allows the connection leases to be relatively long-lived in that they can be updated on a less frequent basis (e.g., to account for changes in user permissions, network addresses, etc.). However, challenges may occur when attempting to access published resources through a browser, such as authentication failures. For example, such failures may result from Internet connectivity to cloud or identity platform resources, rendering these services unavailable. In addition, third-party identity provider (IDP) services may be down or experiencing intermittent failures. These or other types of failures may initially lead a user on a path to success in an authentication flow, but then due to a specific service or intermittent failure cause the authentication flow to become "stuck", leaving the user without the ability to access any published resources, including those enabled with connection leases.

The approach set forth herein allows a browser to present a user interface allowing access to virtual sessions even when an outage or offline condition occurs that would otherwise block authentication and prevent access to the virtual sessions. More particularly, the user interface provides the ability to redirect away from a stuck or failed authentication sequence, yet still access a virtual session using a previously cached asset, such as a cached version of a connection lease. Thus, this approach helps overcome a stuck authentication flow by redirecting the browser away from an address associated with the authentication sequence and to another address where the virtual session may be accessed through the user interface using the cached asset. The redirection may be performed responsive to an input element (e.g., a cancel button) inserted within the user interface during the authentication sequence or automatically, thereby helping ensure that in offline or outage conditions the user still has the ability to access virtual sessions.

Figure 1:
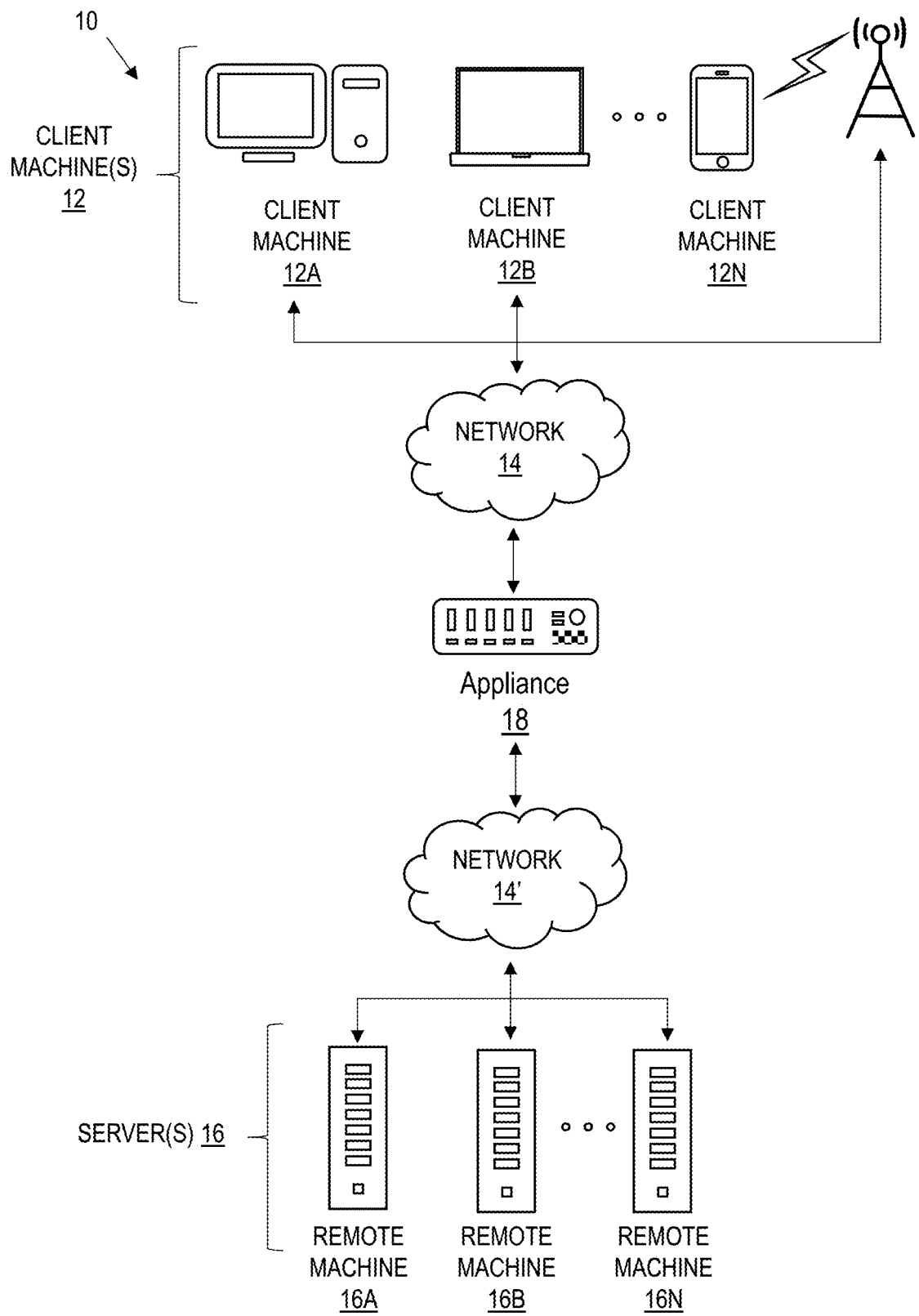
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
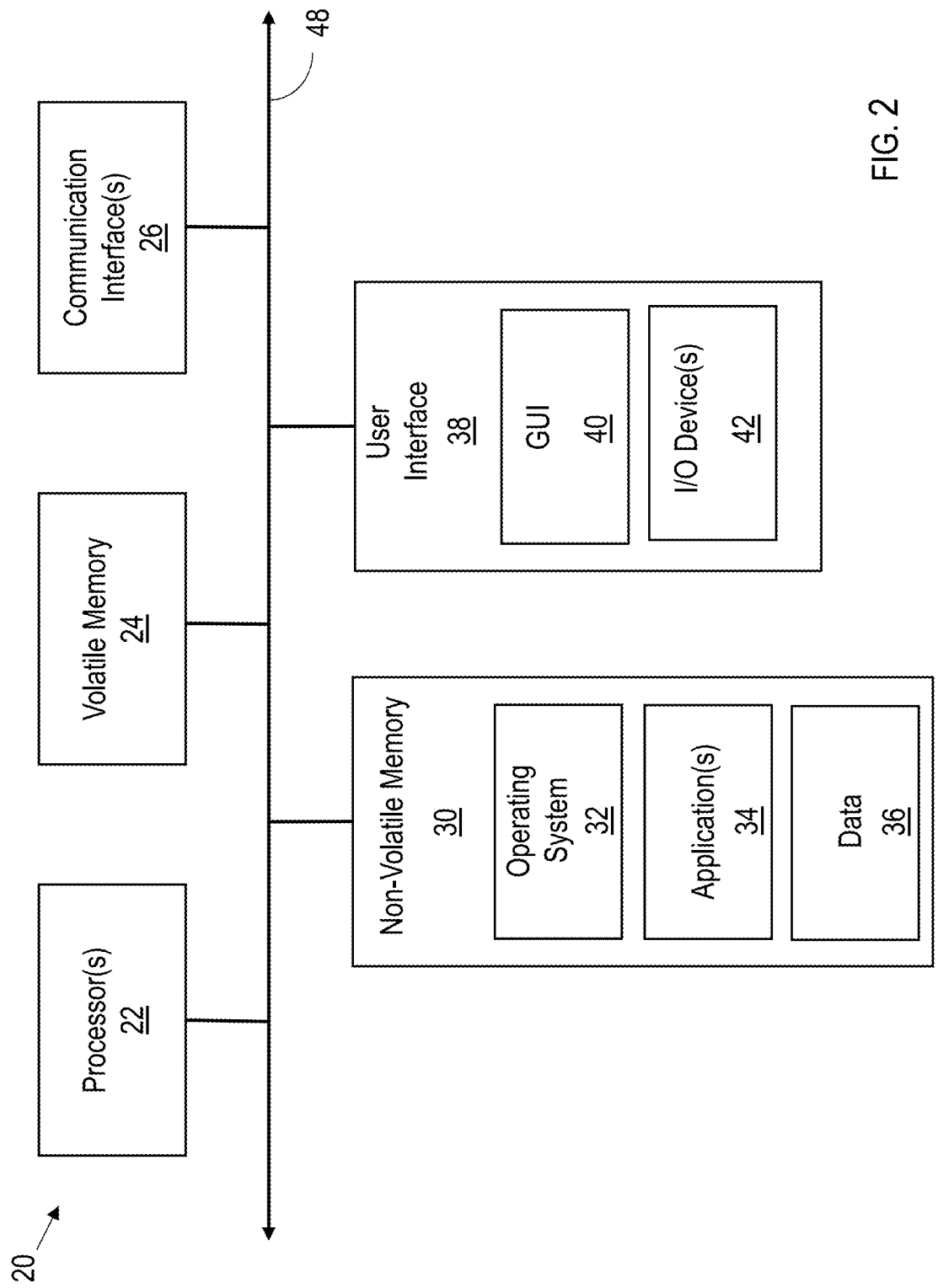
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
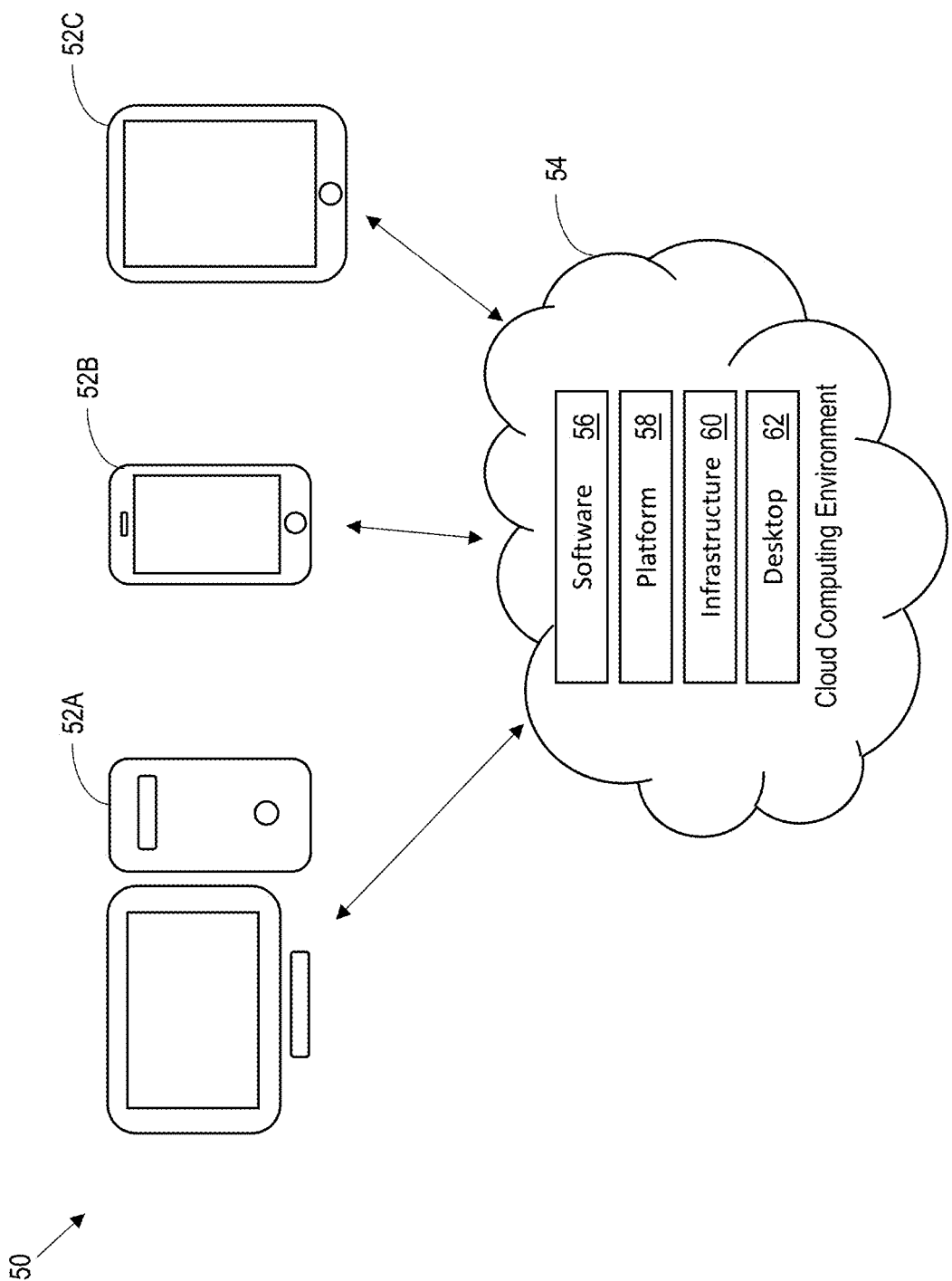
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
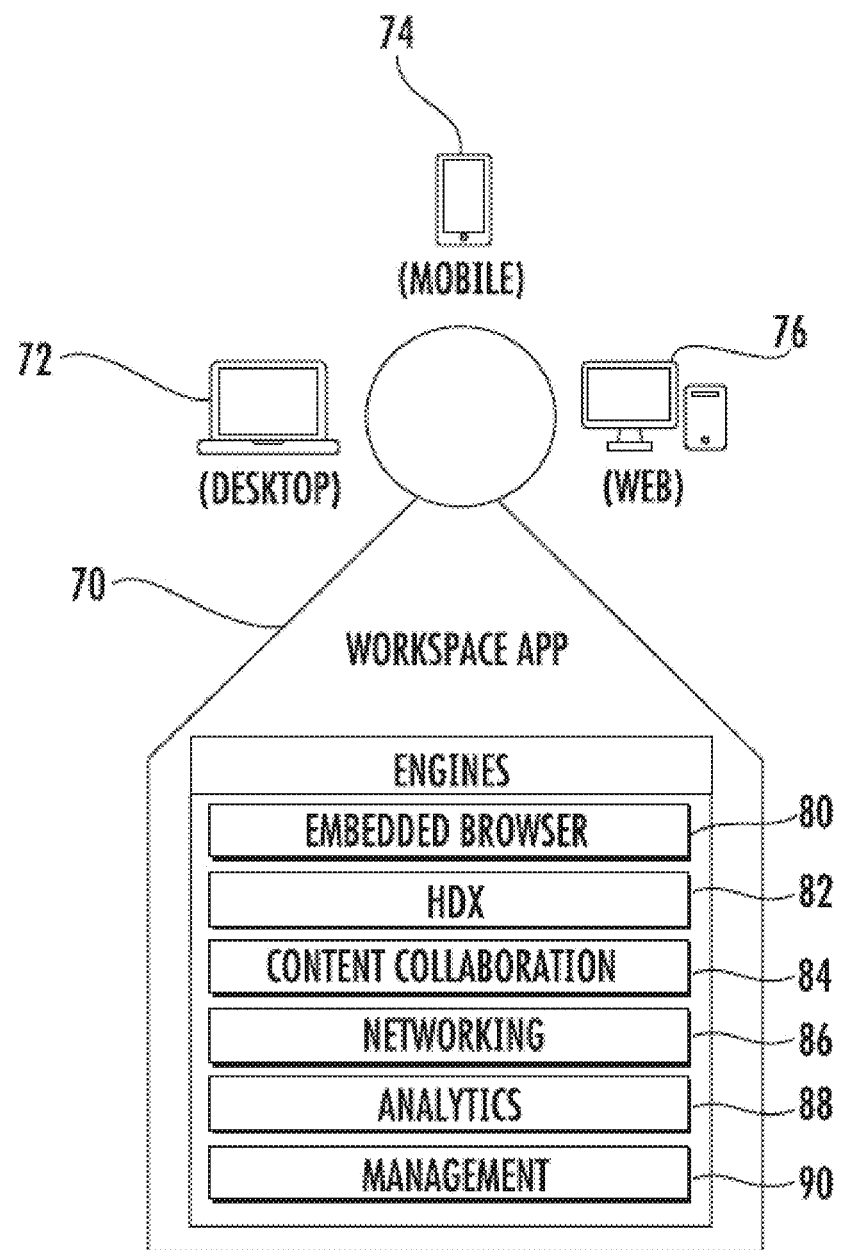
FIG. 4 is a schematic block diagram of desktop, mobile and web-based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
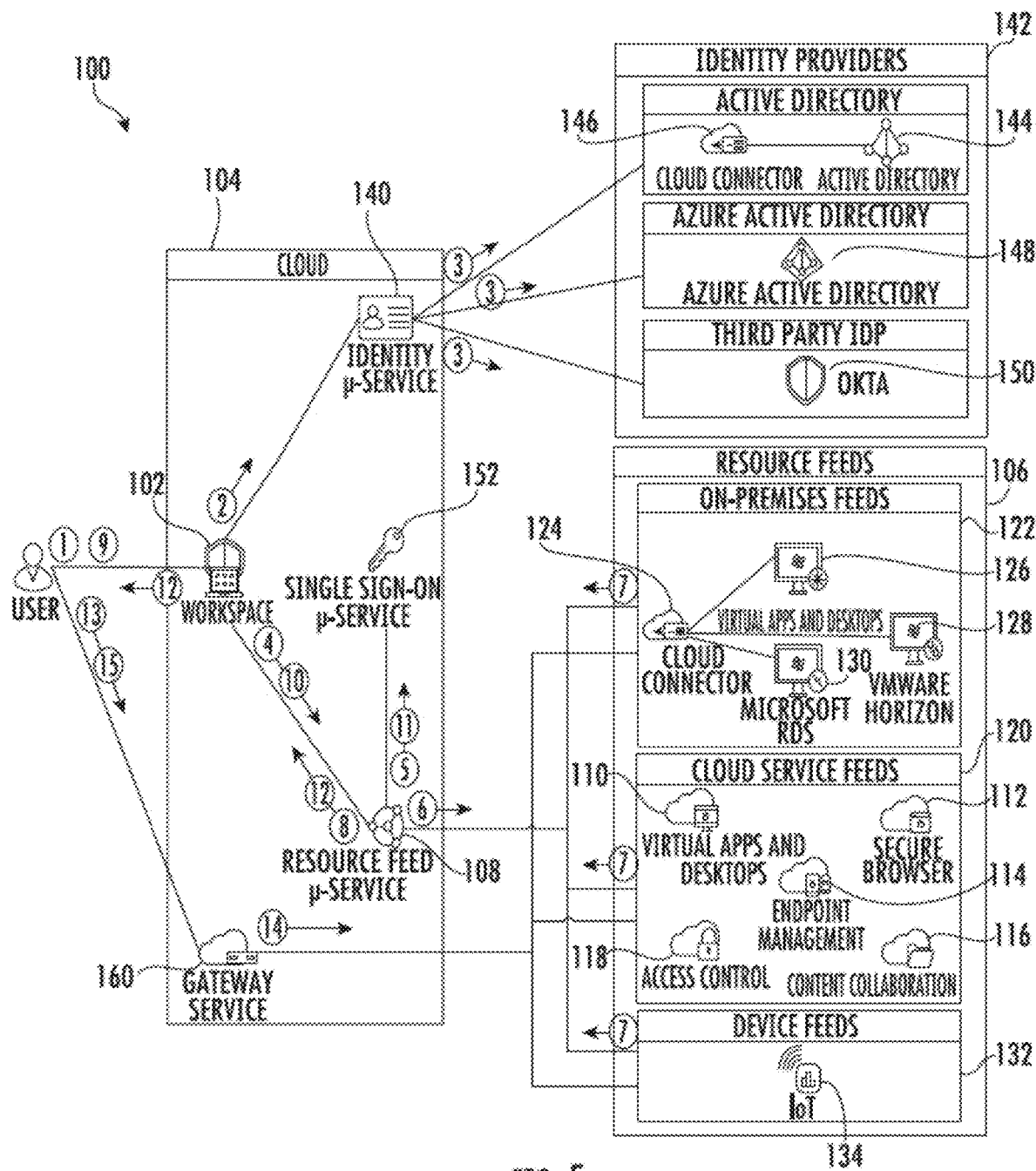
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a user name and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
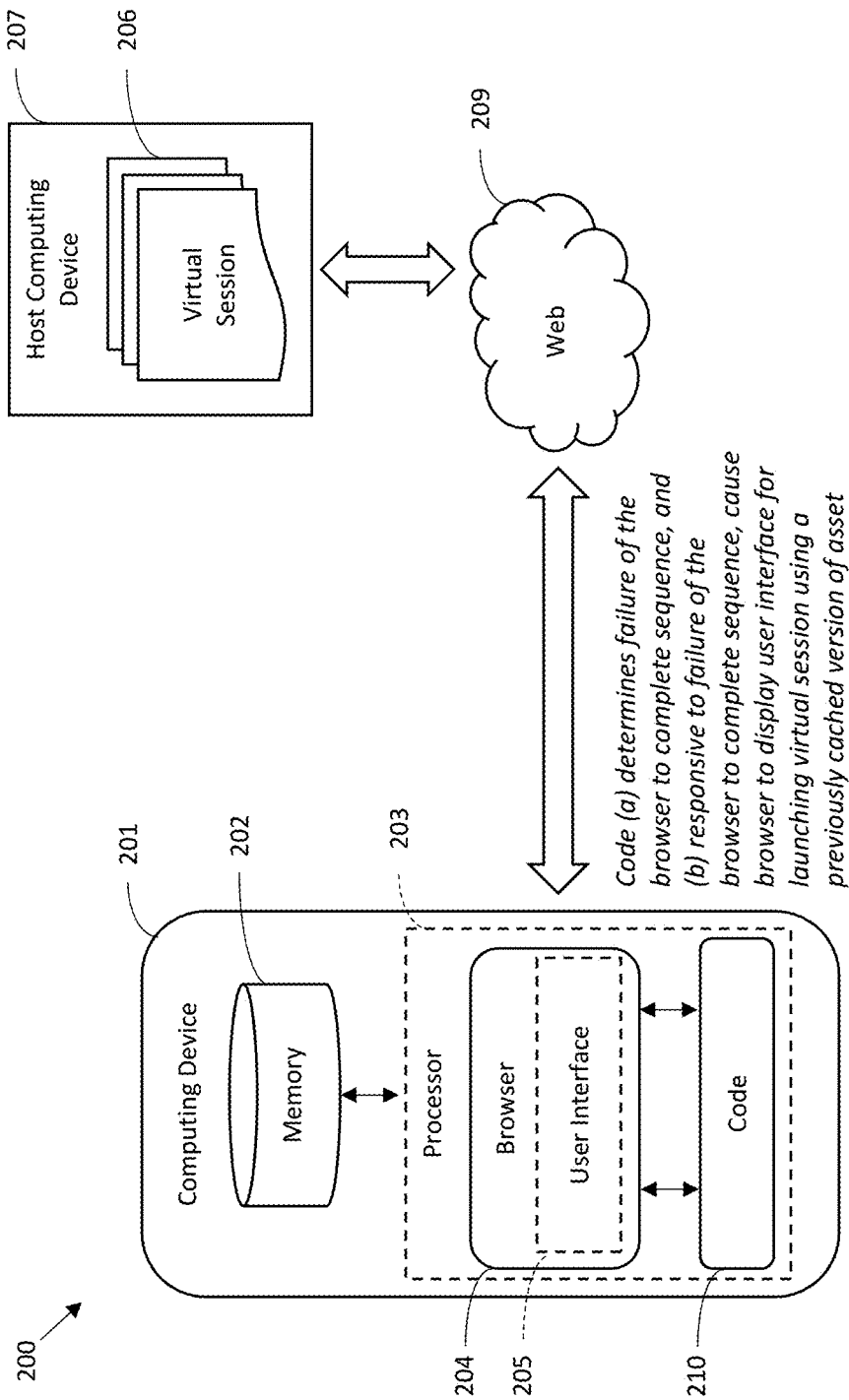
FIG. 6 is a schematic block diagram of a computing system providing virtual session launching based upon cached assets in accordance with an example embodiment.

Turning now to FIG. 6, a computing system 200 illustratively includes a computing device 201 which allows for redirection away from failed Web-based authentication sequences is first described. The system 200 illustratively includes a computing device 201, which in an example embodiment may be a client endpoint device such as a smartphone, laptop computer, desktop computer, tablet computer, etc. The computing device 201 illustratively includes a memory 202 and a processor 203 cooperating with the memory 202 to run a browser 204 configured to complete a sequence (e.g., an authentication sequence) to obtain an asset and display a user interface (UI) 205 (e.g., in an online mode) for launching a virtual session using the asset. Furthermore, the processor 203 is further configured to run code 210 (e.g., a browser extension, as will be discussed further below) configured to determine a failure of the browser 204 to complete the sequence. Responsive to detection of the failure to complete the sequence, the code 210 causes the browser 204 to display the UI 205 (e.g., in an offline mode) for launching the virtual session using a previously cached version of the asset, as will also be discussed further below.

An example architecture in which the endpoint device 201 may be used is now described with reference to the computing system 250 of FIG. 7. More particularly, the computing system 250 provides access to virtual sessions based upon connection leases. In the illustrated example, the connection lease generation functions are performed within a cloud computing service 255 (e.g., Citrix Cloud) which illustratively includes a cloud interface 256 configured to interface with a client device 252 for enrollment and lease generation to access virtual sessions 254. In an example embodiment, the cloud interface 256 may be implemented with Citrix Workspace (CWA), and the client device 252 may be running Citrix Workspace App, although other suitable platforms may be used in different embodiments. The cloud computing service 255 further illustratively includes a Root of Trust (RoT) 257, Connection Lease Issuing Service (CLIS) 258, gateway service 259, broker 260, and database 261, which will be described further below.

The client device 252 has a public-private encryption key pair associated therewith, which in the illustrated example is created by a hardware-backed key store 262. The hardware-backed key store 262 prevents the client device 252 operating system (OS) from accessing the private key. The client device 252 OS performs cryptographic operations with the private key, but without the ability to access/export the key. Examples of hardware-backed key stores include Trusted Platform Module (TPM) on a personal computer (PC), iOS Secure Enclave, and Android Hardware Key Store, for example, although other suitable encryption key generation platforms may also be used. By way of background, in some embodiments, a hardware-backed key store 262, such as a TPM, is a microchip installed on the motherboard of client device 252 and designed to provide basic security-related functions, e.g., primarily involving encryption keys. A hardware-backed key store 262 communicates with the remainder of the system by using a hardware bus. A client device 252 that incorporates a hardware-backed key store 262 can create cryptographic keys and encrypt them so that they can only be decrypted by the hardware-backed key store 262. This process, referred to as wrapping or binding a key, can help protect the key from disclosure, such as from other parts of the client device 252 (e.g., the client device operating system (OS) as described above), and therefore from potential exfiltration to malicious processes running on the client device or from exfiltration to other devices. A hardware-backed key store 262 could have a master wrapping key, called the storage root key, which is stored within the hardware-backed key store 262 itself. The private portion of a storage root key or endorsement key that is created in a hardware-backed key store 262 is never exposed to any other component, software, process, or user. Because a hardware-backed key store 262 uses its own internal firmware and logic circuits to process instructions, it does not rely on the operating system, and it is not exposed to vulnerabilities that might exist in the operating system or application software.

Turning back to FIG. 7, the client device 252 provides its public key to the cloud interface 256 (step (1) in FIG. 7), which then has the public key signed by the RoT 257 (step (2) in FIG. 7) and returns the signed public key to the client device (step (3) in FIG. 7). Having the public key signed by the RoT 257 is significant because the gateway 263, the virtual delivery appliance 253, and the broker 260 also trust the RoT and can therefore use its signature to authenticate the client device public key.

Figure 7:
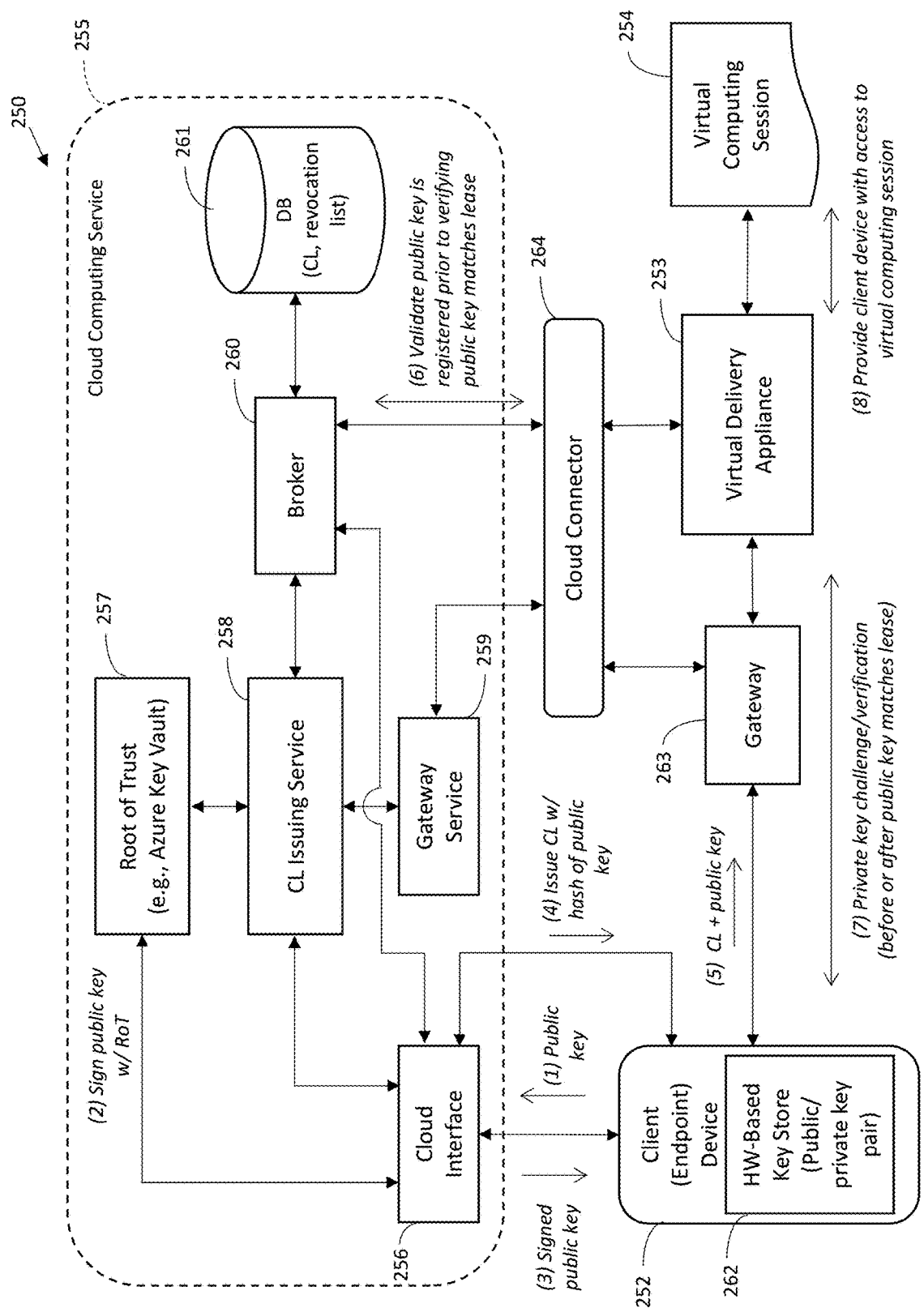
FIG. 7 is a schematic block diagram of a connection lease architecture and independent flow sequences in which the system of FIG. 6 may be implemented in accordance with an example embodiment.

The client device 252 may then communicate with the CLIS 258 via the cloud interface 256 to obtain the connection lease (step (4) in FIG. 7). The client device 252 public key may be provided to a host or virtual delivery appliance 253 (e.g., Citrix VDA) either indirectly via the broker 260 or directly by the client device. In the present example, the virtual delivery appliance 253 is enabled for use with connection leases, in contrast to legacy virtual delivery appliances which are not. If the client device 252 public key is indirectly provided to the virtual delivery appliance 253, then the security associated with the client-to-broker communications and virtual delivery appliance-to-broker communications may be leveraged for secure client public key transmission. However, this may involve a relatively large number of client public keys (from multiple different client devices 252) being communicated indirectly to the virtual delivery appliance 253.

On the other hand, the client device 252 public key could be directly provided by the client device to the virtual delivery appliance 253, which in the present case is done via the gateway 263 (step (5) in FIG. 7). Both the client device 252 and the virtual delivery appliance 253 trust the RoT 257. Since the virtual delivery appliance 253 trusts the RoT 257 and has access to the RoT public key, the virtual delivery appliance 253 is able to verify the validity of the client device 252 based on the RoT signature on the public key and, if valid, may then trust the client device public key. In yet another embodiment, the client device public key may also optionally be signed by the broker 260 beforehand. Both the client device 252 and the virtual delivery appliance 253 trust the broker 260. Since the virtual delivery appliance 253 trusts the broker 260 and has access to the broker public key, the virtual delivery appliance 253 is able to verify the validity of the client device 252 based on the broker signature on the public key and, if valid, may then trust the client device public key. In the illustrated example, the signed public key of the client device 252 is provided directly to the virtual delivery appliance 253 along with the connection lease via a gateway 263. In an example implementation, the gateway 263 may be implemented using Citrix Gateway, for example, although other suitable platforms may also be used in different embodiments.

The virtual delivery appliance 253 and gateway 263 may communicate with the broker 260 and gateway service 259 (which may be implemented using Citrix Secure Web Gateway, for example) via a cloud connector 264. In an example embodiment, the cloud connector 264 may be implemented with Citrix Cloud Connector, although other suitable platforms may also be used in different embodiments. Citrix Cloud Connector is a component that serves as a channel for communication between Citrix Cloud and customer resource locations, enabling cloud management without requiring complex networking or infrastructure configuration. However, other suitable cloud connection infrastructure may also be used in different embodiments.

The client device 252 signed public key or a hash of the client device signed public key (thumbprint) is included in the connection lease generated by the CLIS 258 and is one of the fields of the connection lease that are included when computing the signature of the connection lease. The signature of the connection lease helps ensure that the connection lease contents are valid and have not been tampered with. As a result, a connection lease is created for the specific client device 252, not just a specific authenticated user.

Furthermore, the virtual delivery appliance 253 may use a challenge-response to validate that the client device 252 is the true owner of the corresponding private key. First, the virtual delivery appliance 253 validates that the client device 252 public key is valid, and more particularly signed by the RoT 257 and/or broker 260 (step (6) in FIG. 7). In the illustrated example, the client device 252 public key was sent directly by the client device to the virtual delivery appliance 253, as noted above. In some embodiments, connection lease revocation may be applied when a client device 252 or virtual delivery appliance 253 is offline with respect to the CLIS 258 or broker 260. Being online is not a requirement for use of a connection lease since connection leases may be used in an offline mode. Connection lease and revocation list details may be stored in the database 261 for comparison by the broker 260 with the information provided by the virtual delivery appliance 253.

Second, upon early session establishment, e.g. after transport and presentation-level protocol establishment, between the client device 252 and virtual delivery appliance 253, the virtual delivery appliance 253 challenges the client device 252 to sign a nonce (an arbitrary number used once in a cryptographic communication) with its private key (step (7) in FIG. 7). The virtual delivery appliance 253 verifies the signature of the nonce with the client device 252 public key. This allows the virtual delivery appliance 253 to know that the client device 252 is in fact the owner of the corresponding private key. It should be noted that this step could be performed prior to validating the public key of the client device 252 with the RoT 257 and/or broker 260 in some embodiments, if desired.

Furthermore, the virtual delivery appliance 253 validates that the connection lease includes the public key (or hash of public key) matching the client device 252 public key. More particularly, the virtual delivery appliance 253 first validates the connection lease signature and date, making sure that the broker 260 signature on the lease is valid (using the RoT 257 signed broker public key, since the virtual delivery appliance trusts the RoT) and that the lease has not expired. Moreover, the virtual delivery appliance 253 may verify that the connection lease includes the client device 252 public key, or a hash of the client device public key, in which case the virtual delivery appliance computes the hash of the client device public key. If the connection lease includes the matching client device 252 public key, then the virtual delivery appliance 253 confirms that the connection lease was sent from the client device for which it was created.

As a result, if a connection lease is stolen from the client device 252 and used from a malicious client device, the session establishment between the malicious client and the virtual delivery appliance 253 will not succeed because the malicious client device will not have access to the client private key, this key being non-exportable and stored in the hardware-backed key store 262.

The illustrated connection lease management infrastructure also advantageously allows for connection lease validation using a "reverse prepare for session" operation from the virtual delivery appliance 253 (e.g., a Citrix VDA, etc.), as a target resource location, to the Broker 260 (e.g., Citrix Virtual Apps and Desktops Broker). This may be done in conjunction with the connection lease exchange that occurs between the client device 252 and the virtual delivery appliance 253, and utilizing signed responses from the broker 260 and virtual delivery appliance 253. These play a significant role for the resiliency, security, performance and user experience (UX) with respect to connection leasing.

Figure 8:
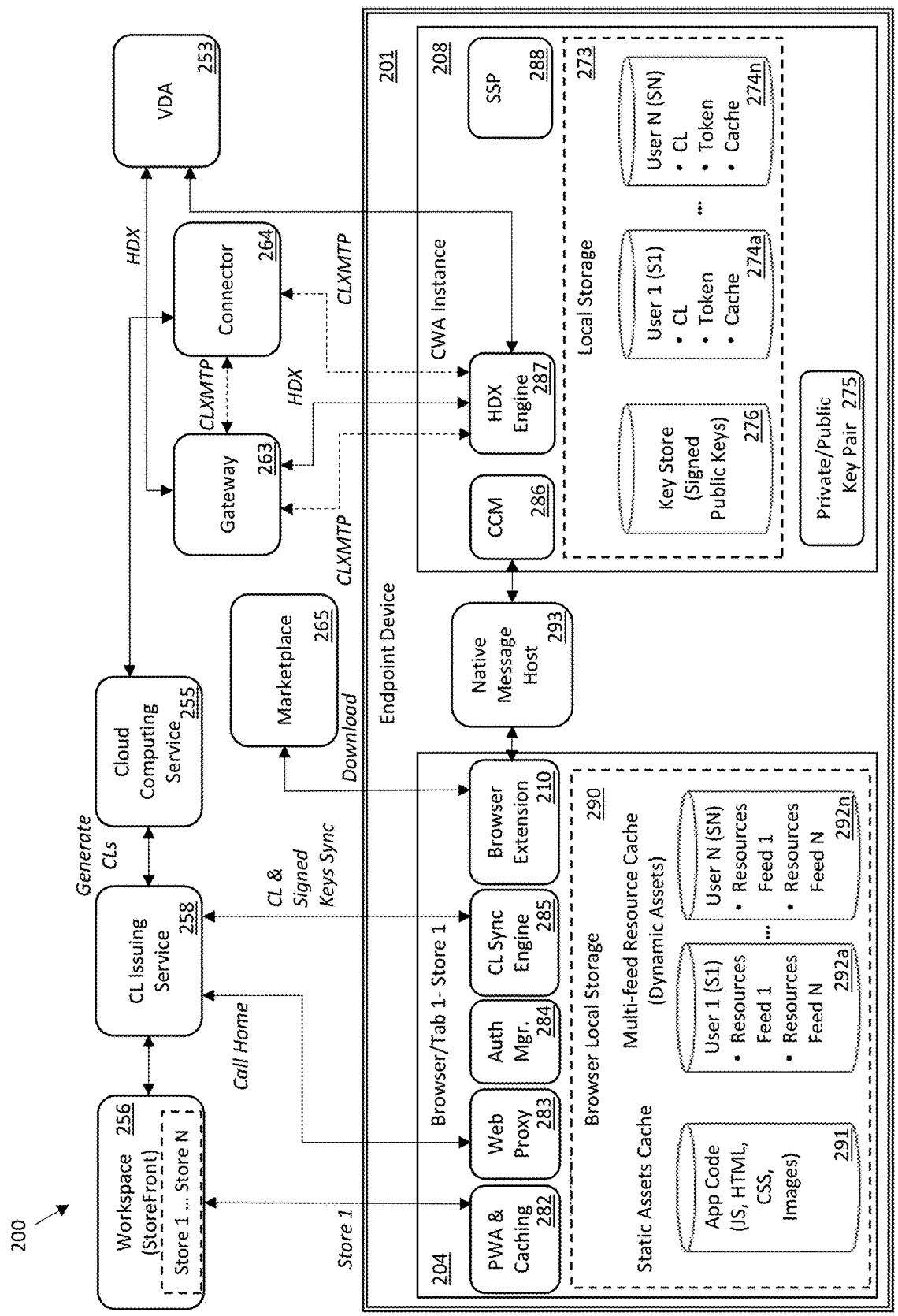
FIG. 8 is a schematic block diagram of an example implementation of the system of FIG. 6 within the connection lease architecture of FIG. 7.

Turning to FIG. 8, an example implementation of the system 200 which is implemented using the connection lease infrastructure set forth in FIG. 7 is now described. The browser 204 illustratively includes a Progressive Web App (PWA) and in-app caching module 282 for caching of static assets in static assets cache 291 of browser local storage (cache) 290. By way of example, the static assets may include app code such as Javascript (JS), hyper-text markup language (HTML), cascading style sheets (CSS), images, etc., which are used to render a user interface. Moreover, the PWA and in-app caching module 282 further provides multi-feed resource awareness and caches 292a-292n for dynamic assets including published assets (such as virtual apps and desktops). An authentication manager 284 may cooperate with PWA and in-app caching module 282 to perform the requisite authentication to retrieve and update the static/multi-feed assets in the caches 291 and 292a-292n.

The browser 204 further illustratively includes Web proxy code 283 (Web proxy) configured to perform calls home to the CLIS 258 to get online status and facilitate operation when the cloud computing service 255 is offline. That is, the Web proxy 283 helps ensure that the user interface can be loaded in an offline mode, and optionally that a reconnect banner can be used allowing for reconnection when the cloud computing service 255 comes back online. Javascript (JS) bridge methods may be utilized by the Web proxy 283 to get online status from the CLIS 258, for example. In addition, a CL synch engine 285 communicates with the CLIS 258 to perform operations such as CL and key synchronization, although in some embodiments these operations may optionally be delegated as background operations to the native CWA instance 208 when the browser 204 is closed, as will be discussed further below.

The native CWA instance 208 illustratively includes a common connection manager (CCM) 286 and an HDX engine 287 for communicating with a gateway 263, connector 264, and/or virtual delivery appliance 253 to access virtual resources (e.g., virtual apps/desktops, SaaS/DaaS servers, etc.), as discussed further above. A Self-Service Plugin (SSP) 288 may perform calls home to the CLIS 258 on behalf of the CWA instance 208. The endpoint device 201 further illustratively includes a native message host 293 which allows one or more browser extensions 210 to communicate with the CCM 286, as will be discussed further below.

The CLs are bound to the endpoint private/public key pair, such as by using the endpoint private/public key pair to encrypt the connection lease, or embedding a version of the endpoint public key signed by the RoT 257 in the connection lease, for example. In the illustrated example, user CLs are stored in a local file storage 273 in respective stores 274a-274n. The endpoint private/public key pair may be stored in a key store 275 (e.g., by a TPM). Signed public keys (e.g., for the gateway 263, virtual delivery appliance 253, etc.) may be stored in a key store 276 in the local storage 273.

In accordance with one example embodiment, the endpoint device 201, gateway 263, connector 264, and VDA 253 may utilize a connection lease exchange mutual trust protocol (CLXMTP) between one another to exchange and perform validation of the public keys and CLs of one another. In the illustrated example, the initial CLXMTP connection between these components (represented by two-way dashed arrows) is used for CL exchange and validation, while the subsequent HDX connections (represented by solid two-way arrows) are used to exchange information after validation has been performed via the CLXMTP connections, as shown.

To perform a CLXMTP CL exchange between the endpoint device 201 and the VDA 253, for example, the HDX engine 287 cooperates with the VDA to establish: (1) a transport layer session between the endpoint device and the virtual delivery appliance; (2) a presentation layer session via the transport layer session; and (3) a connection lease exchange tunnel via the presentation layer session. The VDA 253 may accordingly receive a connection lease from the endpoint device 201 through the connection lease exchange tunnel, and then perform the above-described lease validation process with the broker computing device 260. The VDA 253 may further issue a resource connection ticket to the endpoint device 201 through the connection lease exchange tunnel responsive to the validation. This process may be similarly performed between the endpoint 201 and the gateway 263, as well as between the gateway 263/VDA 253 and the connector 264.

By way of example, the presentation layer session may be a Common Gateway Protocol (CGP) session, and the transport layer session may be a Transport Layer Security (TLS) session or a Transmission Control Protocol (TCP) session. Also by way of example, the transport layer session may comprise at least one of an Enlightened Data Transport (EDT) session, Datagram Transport Layer Security (DTLS) session, and a User Datagram Protocol (UDP) session.

In the present example, the browser extension 210 and native messaging host 293 provide a secure bridge between the browser 204 and native CWA instances 208, relaying various types of control and data. This allows the browser 204 to advantageously initiate or launch published resources to access virtual sessions while leveraging the secure native CL and keys storage, and CLXMTP capabilities, of the CWA instance 208, as well as maintaining CL and token binding to the native CWA instance. Moreover, the example approach also allows for the reuse of existing functionality in the browser 204, e.g., user interface and resource caching. The native CCM 286 is securely bootstrapped by and communicates with the native messaging host 293, and maintains per-browser-tab contexts, etc. In some embodiments, Workspace 256 to CWA instance 208 communication may be encrypted and "hidden" from browser 204, if desired.

The CL sync engine 285 may support synchronization of multiple stores from the Workspace storefront 256. This may run in a global browser extension 210 background thread, helping ensure that the synchronization can be done in the background, although this may also be run in a per-tab (per-store) browser extension thread in some embodiments. The browser extension 210 may be downloaded from an online marketplace 265 as a plugin app to the particular browser 204 being used (e.g., Chrome, Safari, Edge, etc.). Javascript bridge methods for storage of files (e.g., CLs and signed public keys) may be implemented in the browser extension 210 and relayed to the native CWA instance 208 for storage.

The browser extension 210 relays various types of control and data between the browser 204 and native CWA instance 208. By way of example, the following permissions may be declared in a browser extension 210 manifest: native communication ("nativeMessaging"); background ("background"); and multiple tabs ("tabs"). There is a 1:1 relationship between a browser extension 210 for a given browser 204 and the native messaging host 293. In an example embodiment, the native message host 293 utilizes a Browser-Native Protocol (BNP) for relaying communications between the browser extension 210 and the CCM 286. The BNP may be extensible and backward compatible, since browser extension and native CWA instance 208 components may be updated independently. Thus, the native message host 293, rather than assuming any particular version of the browser extension 210, may negotiate with the browser extension to determine which features/syntax it supports, and communicate with the browser extension using the BNP accordingly.

The browser extension 210 can be downloaded via the marketplace 265 as noted above (or other sources based upon enterprise policy), while the native messaging host 293, CCM 286 and the rest of the native CWA instance 208 components are installed and updated as a native application. In some implementations, the browser extension 210 may trigger silent telemetry launches based on telemetry site properties. Some of the browser extension 210 and native messaging host 293 code may be shared between different browsers (e.g., Chrome and Edge Chromium), between Javascript bridge method implementations in browser extensions; and for the BNP protocol implementation. The following table provides a list of example information which may be sent from the CWA instance 208 to the browser 204, and vice-versa, using the BNP.

| CWA to Browser | Browser to CWA |
| --- | --- |
| Capability Negotiation: bind request, bind commit | Capability negotiation: bind response |
| Endpoint Public Key Status on CL launch, so browser could fall back to ICA File launch. | Connection Leases Signed Public Keys: {Endpoint Public Key} RoT, {CLIS Public Key(s)} RoT, RoT Public Key(s) - primary/current and secondary/previous |
| CL version | BE ID, BE Type |
| Supported crypto capabilities: encryption and hashing algorithms. | Tab ID |
|  | User ID, customer ID Store URL Folder for CL Sync Launch request with reference to: 1. Published resource key GUID 2. Launch preference (CL vs. ICA File) 3. Correlation ID originating from BE Note: Native CWA may perform both CL resolution and HDX launches. A gateway connection ticket (GCT) is used for gateway connections. UI-related telemetry, e.g., for switching between online/offline mode, clicking on Reconnect Banner, etc. |

In some embodiments, the BNP protocol may support other features such as secure (protected) ICA file launches, and a Web-based connection status user interface, for example.

The CCM 286 hosts the BNP and communicates with the native messaging host 293 over a securely bootstrapped connection, e.g., an anonymous duplex named pipe. CCM 286 may be implemented as a single instance on an endpoint device 201. In general, there is an N:1 relationship between the browser extension 210/native messaging host 293 combo and CCM 286. That is, N browser tabs in the same or different browsers 204 communicate with a single instance of CCM 286. However, CCM 286 manages one or more communication contexts with the respective browser tabs. Each context may be identified by a [BE ID, Tab ID] and may also contain BE Type, User ID, Customer ID, Store URL, negotiated capabilities, etc.

Functionality of the CWA instance 208 which may be leveraged to implement the data exchange with the browser 204 may include: private/public key pair ownership; secure storage of signed public keys, LLAuthTs, PAuthTs, etc., as well as data protection (DP) API or key chain; storage of CLs per user, per store; CL parsing and decryption; attempting different options in CL, such as a zone depth first search, redirect target, fan-out, power management (deny with retry), etc.; CLXMTP via the gateway 263 and connector 264; temp ICA file generation for both the gateway (with GCT) and direct connections; silent telemetry launching; connector as a beacon; and SSOn to HDX with Long-lived Auth Tokens (LLAuthT) and Polymorphic Auth Tokens (PAuthT).

Security of communications may be handled natively by the browser extension 210 and using existing browser technology. In particular, the browser extensions 210 may be signed and deployed via the marketplace 265 (or otherwise via enterprise policy). Production browsers, e.g., Google Chrome, Microsoft Edge Chromium, Safari, only load signed browser extensions (plugins). Furthermore, the native messing host 293 may be hard-coded to communicate with a specific browser extension 210 by ID. Likewise, a browser extension 210, as instructed by its manifest, may be hardcoded to communicate with the native messing host 293 (e.g., by path and module name). Furthermore, additional module signature validation may be required for replacing the native messaging host 293 in some embodiments, although even without such validation replacing it may otherwise require admin privileges, which still affords significant protection.

The native messaging host 293 plays a relaying role between the browser extension 210 and the CCM 286 (i.e., relaying messages back and forth). In an example embodiment, the native messaging host 293 carries out the following sequence of operations to securely bootstrap the communication between a browser extension 210 instance and the connection manager process:

(1) discover the unique connection manager process instance;
(2) verify the identity of the connection manager process (unique) instance to ensure that the connection manager process is not being spoofed—i.e. replaced with a malicious process;
(3) create two anonymous named pipes—one reader and one writer (anonymous named pipes are used to make it difficult to hijack the communication); and
(4) provide the two anonymous named pipe handles to the CCM via an operating system inter-process communication (IPC) mechanism.

By way of example, on the Windows OS, steps (1) and (2) can be achieved as follows. The CCM 286 (e.g., a Win32 application) creates a hidden window. The native messaging host 293 looks up the hidden window via the Win32 EnumWindows function and retrieves a handle to the hidden window. From the hidden window handle the CCM 286 Process ID is retrieved via the Win32 GetWindowThreadProcessId function. From the CCM 286 process ID, the native messaging host 293 process obtains a handle to the CCM. The handle to the CCM 286 allows the native messaging host 293 to retrieve information about the process (e.g., its path). The native messaging host 293 may then verify that the path is the expected installation path for the CMM 293, and verify that the CCM binary is digitally signed by the expected entity (e.g., the company that produced the binary).

On the Windows OS, step (4) can be achieved in different ways. One is by sending a window message (e.g., with the Win32 PostMessage function). Another is by making an RPC/COM call to the CCM 293 (if it is playing the role of a COM server).

After receiving the two anonymous named pipe handles from the native messaging host 293, the CCM 286 performs the following steps: (1) create a reader/writer context (specific to the native messaging host); (2) open the two anonymous named pipes from their handles; and (3) prepare to read messages from reader anonymous named pipe and prepare to write messages to writer anonymous named pipe.

This approach advantageously leverages functionality already built for the browser 204 (Web-based) and native CWA instance 208. Moreover, it provides for secure communication between the browser 204 and native CWA instance 208, without interrupting other connection lease security measures such as CL and GCT user-device binding. Moreover, this approach improves the user experience of browser 204 to native CWA instance 208 IPC, while being transparent to the user. For example, this approach allows for a single prompt to endorse a browser extension 210, as opposed to multiple prompts with existing approaches. It may also be leveraged for additional requirements, such as to protect ICA files, provide a Web-based connection status user interface, and allow for an HTML5 receiver to support native virtual channel (e.g. USB, etc.) desktop integration, for example. In some embodiments, a "background" permission may optionally be declared in the browser extension 210 manifest (e.g., in Chrome) to cause the browser 204 to start up early and shut down late, so that apps and extensions can have a longer life for performing synch and update operations, for example.

As noted above, Connection leases (CLs) provide long-lived, mostly static entitlements to published resources. Furthermore, Progressive Web App (PWA) Service Worker caching, which may also be used within the above-described architecture, allows for Web-based user interface (UI) (e.g., the Workspace UI) to be functional even in offline or degraded network conditions. In an example implementation, the system 250 will support native CWA apps. However, a significant amount of users may utilize a browser for the Workspace/StoreFront store 256, but also have a native CWA instance installed on the endpoint device 252, so that following the launch within the browser (Workspace Store) window, the native HDX Engine is invoked with the downloaded ICA (connection descriptor) file. This use case may be considered a "hybrid" case. This approach helps ensure familiar user experience (UX) with the browser and at the same time better HDX performance (e.g., for graphics, multimedia) and feature set (e.g. Smart Card, USB, Seamless Windows) compared to using an HTML5 HDX Engine in the browser.

There are also some use cases where no native CWA components are installed on the endpoint device 252. This is a zero-install configuration where both the Workspace Store 256 and the HDX Engine (HTML5-based) reside within the browser. This use case may be considered a "pure" browser case.

In both of these cases, the user authentication context is in the browser 204, and using a browser has unique challenges. For example, the browser does not offer the same level of security for asset storage as a native CWA instance, such as: access to the TPM, storage of private/public key pairs, signed public keys, Connection Leases (CL), Gateway Connection Tickets (GCT), Long Lived Auth Tokens (LLAuthT), Polymorphic Auth Tokens (PAuthT) for single sign on (SSOn) into HDX, etc. Another challenge is that the browser 204 does not offer the same level of persistence, e.g., the browser could be configured to clear the cache upon exit, including device reboot.

Furthermore, the browser 204 has a limited lifetime, in that it can be closed by a user after a brief use. This diminishes the opportunity for background operations that are important for resiliency, e.g., periodic download of CLs, which may otherwise be performed by a native app. Browsers may also have a significant attack surface, and access to native (raw) sockets is generally limited. Although WebSockets can be used to channel protocols such as secure connection lease protocols (which will be discussed further below), this requires adding WebSocket support to multiple backend systems such as Gateway, Connection, and VDA, which bears a higher engineering cost. In addition, with the browser 204 there is no "user" awareness, which makes kiosk support for usage by multiple users on a shared kiosk device or terminal difficult and potentially unfeasible. Security, resiliency and performance of components such as UI caching, keys, CLs and various other user-device-bound tokens is important to maintain. Moreover, it may also be desirable to enable multi-user, multi-store and kiosk (shared terminal) use cases.

When the user authentication context is in the browser, this results in unique challenges. For example, there are various reasons why authentication in the browser may fail. With respect to the example of FIG. 7, for example, Internet connectivity to Workspace and the Citrix Identity Platform (CIP), aka Athena, may not be currently available. In addition, CIP and or a required third-party identity provider (IDP) services may be down or experiencing intermittent failures. Particularly problematic types of failures are those that initially lead a user on a path to success in an authentication flow, but then due to a specific service or intermittent failure the authentication flow becomes "stuck".

In such cases, the browser user interface would typically display a failure message informing the user that the system cannot perform the authentication, with no options for the user except closing the user interface window or potentially attempting to re-start the authentication process over again. Also, the system would typically block all access to the user's published resources in response to an authentication failure (e.g., Internet connection is available but CIP is down, the auth manager 284 times out, etc.), which may diminish resiliency and user experience.

Authentication in the browser 204 involves multiple page redirects between an authentication UI, CIP (DSAuth and OIDC), third-party IDP, etc. If the authentication process gets stuck or fails, in a typical implementation the user would be able to close a logon page/tab but not return back to the authentication UI.

Figure 9:
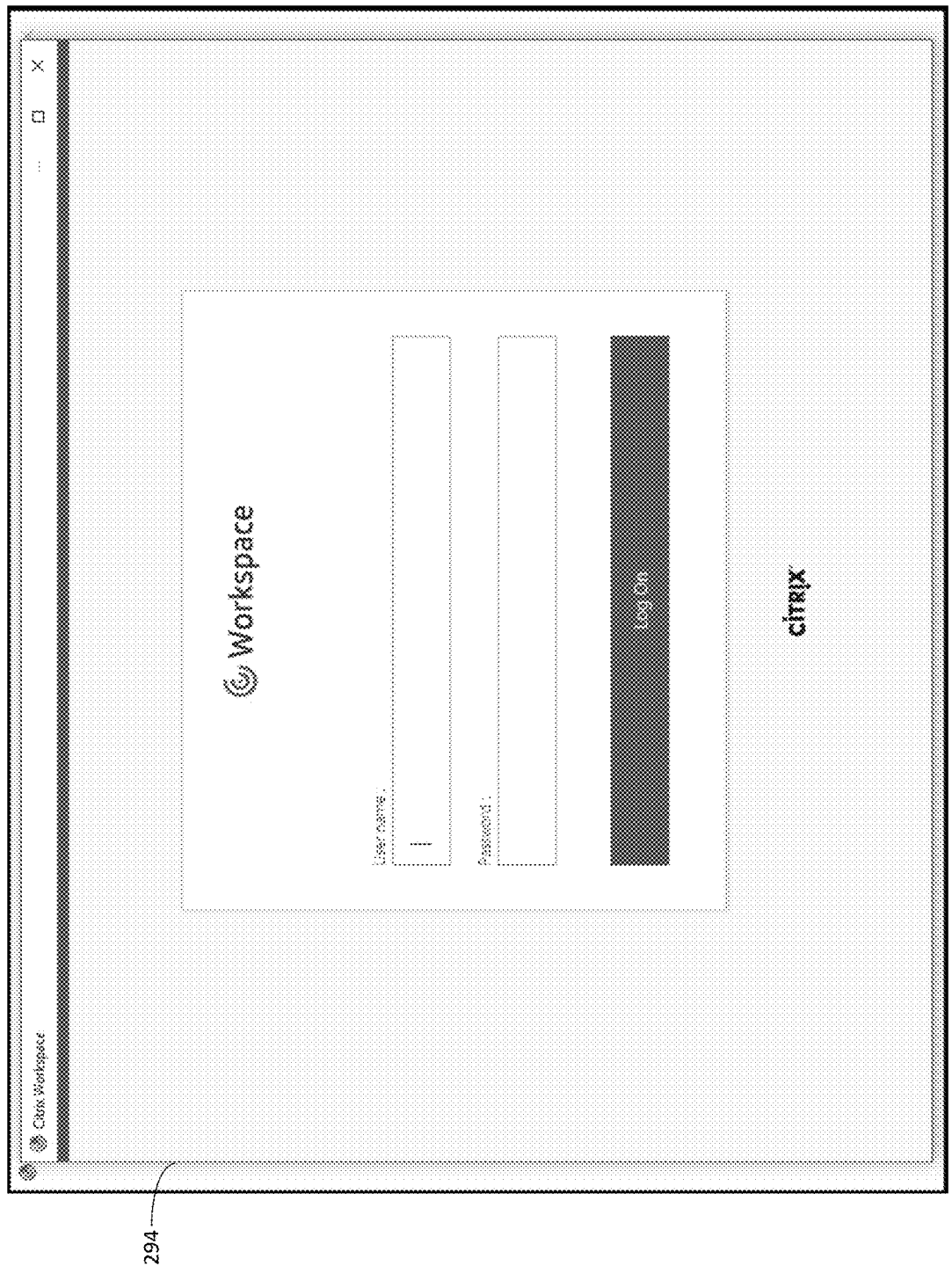
FIGS. 9-11 are a series of display views of a user interface of the system of FIG. 8 which provide cancellable Web-based authentication to virtual sessions and redirection to an offline resource access page in an example embodiment.
Figure 10:
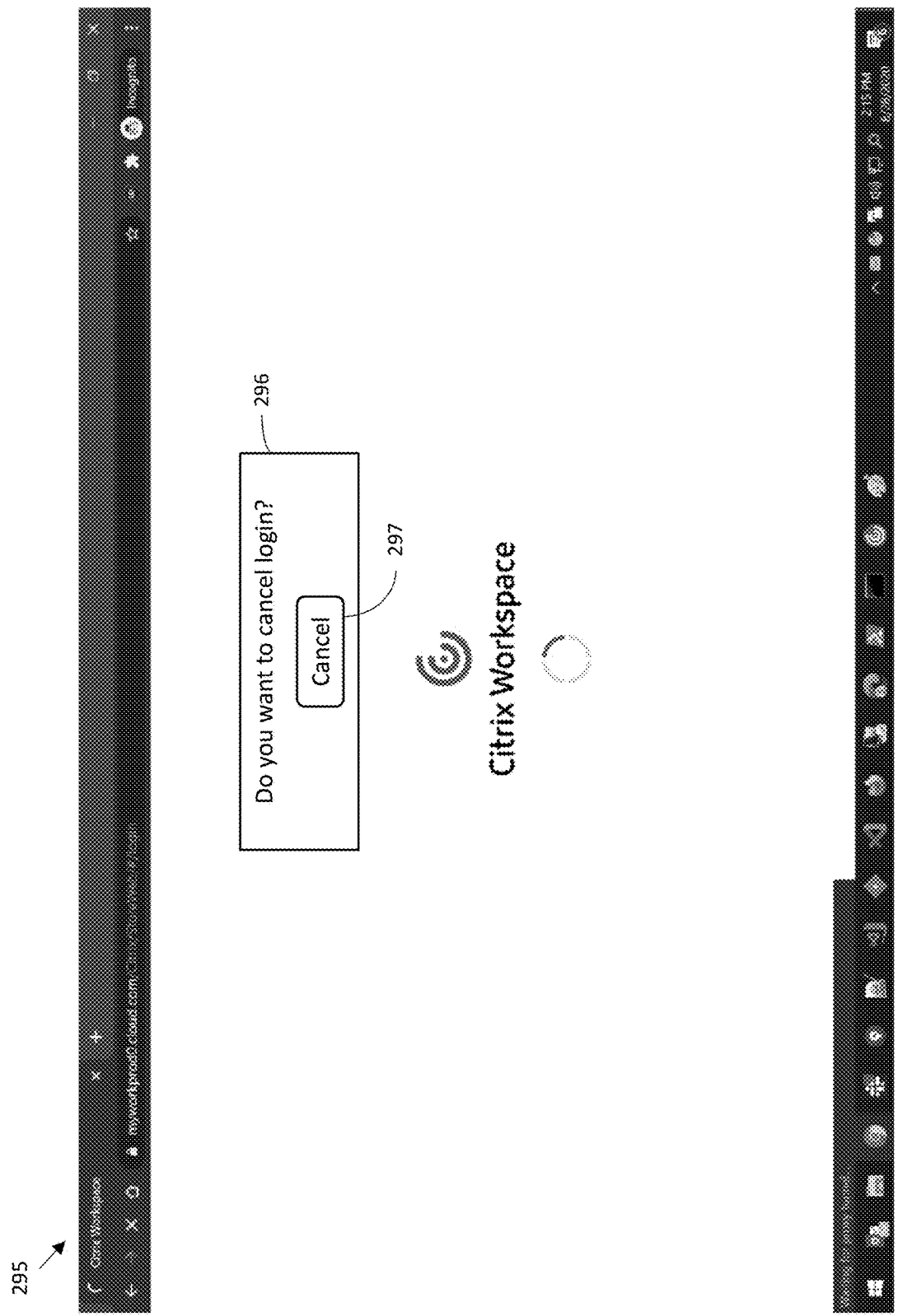
Figure 11:
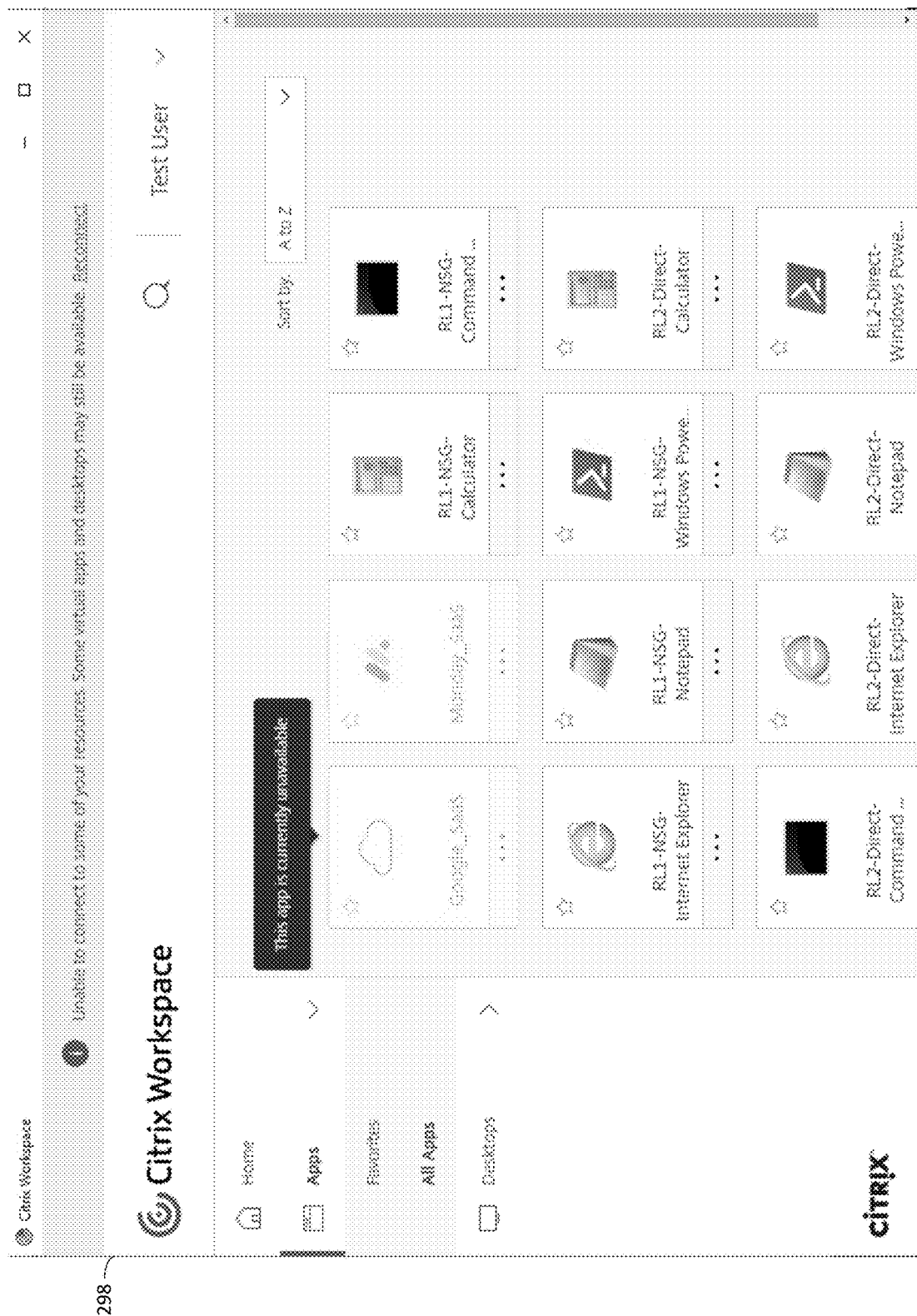

Referring additionally to FIGS. 9-11, an authentication login screen 294 is provided by the browser 204 for providing logon authentication credentials, e.g., user name and password. Once this data is entered, the browser 204 transitions (as shown in FIG. 10) to the authentication UI (as shown here for Citrix Workspace, for example) while the above-described authentication proceeds. However, the browser 204, in some examples, presents the authentication UI 295 in a cancellable form as shown by FIG. 10. That is, the browser 204 provides users with the ability to perform redirections to another page(s), here through an embedded banner 296 including a "cancel" button 297 or other forms of input devices. The cancel button 297 provides the user with a way to go back "Home" to a resources page 298 (shown in FIG. 11) when the authentication process is otherwise stuck or inoperative. This helps ensure that in offline conditions, or if the authentication fails, times-out or is canceled by the user, the resources page 298 can be loaded in an offline mode to enable the user to use cached assets to access applications in which the user would normally be entitled to use.

In this regard, the browser extension 210 also serves as a "watchdog" for providing the cancellable Web-based authentication UI 295. More particularly, the browser extension 210 may insert the cancel/home button 297 (or other actionable UI element) into various types of authentication-related web pages, including across redirects, for example. In one implementation, the browser extension 210 may be configured to monitor auth-related URL addresses and state transitions, e.g., to determine when the authentication login page 294 is loaded (signaling the start of the auth sequence), or when the resources page 298 is loaded (signaling the end of the authentication sequence). In accordance with another example, the cloud interface 256 (e.g., Workspace) may inform the browser extension 210 when to start/stop inserting the button 297 and tracking events.

If the user clicks the button 297 (or if an optional timeout occurs), the browser extension 210 loads the resource page 298 in an in offline mode, i.e., from cached assets. In the offline mode, some resources are available while others are not. More particularly, those that are CL enabled and have a cached CL from a prior logon may be shown as available for launch in the page 298, while those that are not CL enabled may be presented as unavailable (and optionally with an indication that they are "currently unavailable" as shown in the present example). For example, some SaaS apps may not be CL enabled and accordingly require a successful authentication each time they are launched. In some embodiments, sensitive resources such as files and notifications may be hidden (not presented) in the offline mode. Example HTML code which may be embedded by the browser extension 210 within the UI page code for inserting or injecting the banner 296 and cancel button 297 is as follows:

```
<span style="
   position: absolute;
   z-index: 100;
   font-size: medium;
   left: 30%;
   top: 11%;
   display: inline;
   border: 1px dotted;
   background: white;
   margin: 20px;
   padding: 20px;
   color: black;
">Do you want to cancel login?
<button style="
   display: inline-block;
">Cancel</button>
</span>
```

In some embodiments, multi-feed awareness may be provided. For example, if only the broker 260 is down but Workspace 256 or the Internet connection are still up, UI caching may still be performed intelligently by being aware of the broker 260 health and showing previously cached resources. Similarly, if an aggregated on-prem site is down, this may not otherwise affect the availability or freshness of available assets.

In cases of a first time use (FTU) where no static assets (app code) have previously been loaded, the browser extension 210 may display an embedded/preconfigured error page, for example. An error page may similarly be displayed where no dynamic assets (published resources) are available. It should be noted, however, that in some embodiments a connection lease wallet may be used to help overcome the FTU and stateless thin terminal use cases, by allowing the user to securely roam their leases and UI cache, e.g., with their smart phone (virtual smart card) or a traditional physical smart card.

The browser extension 210 may be configured for monitoring different URLs or modes of operation. The authentication UI 295 may be also configurable and brandable. This approach provides resiliency and enhanced user experience in browser-based authentication flows, in that the user has the ability to break out of a failed authentication flow and return to the resources or home page 298 to launch those CL enabled resources for which CLs have previously been cached. As will be discussed further below, the browser extension 210 may similarly be used to improve authentication flows with microapps. Moreover, different types of Web-based UI flows, not necessarily authentication related, can be made cancellable by the browser extension 210 to provide resiliency features, which may configure URLs to be monitored as well.

The foregoing will now be further described with reference to the sequence diagrams 320 of FIGS. 12A, 12B and 330 of FIG. 13, in which the following abbreviations are used.

| Abbreviation | Meaning |
| --- | --- |
| AM | Authentication Manager. Proxies auth to CIP and access to cloud services. |
| CIP | Citrix Identity Platform, a.k.a. Athena Federated Identity Management System, including (legacy) Delivery Services (DS) Auth. Athena provides its own Identity Provider (IDP) but can also integrate with third party IDPs or other identity systems. Athena is based on OpenID Connect (OIDC). To authenticate to Athena, CWA displays a web view of the Athena login page or a third party IDP login page. DS Auth is a Relying Party (RP) of OIDC. |
| CL | Connection Lease |
| CLIS | Connection Lease Issuing Service |
| CWA | Citrix Workspace App |
| DSAuthT | DS Authentication Token. Primary unless otherwise specified as secondary for specific service. |
| DS Auth | Delivery Services Auth |
| IDP | Identity Provider |
| OIDC | OpenID Connect |
| PWA | Progressive Web App (part of CWA or in separate browser). JS installing Service Worker at endpoint proxying and caching communication with WS. Allows offline use of WS Store (published resources) and improves performance even in online mode. |
| RP | Relying Party |
| SoR | System of Record |
| SP | Service Provider |
| SSOn | Single Sign On |
| SSP | Self Service Plugin (part of native CWA). Talks to WS via AM to perform pre-launch foreground and background operations. |
| WS | Citrix Workspace |
| WSP | Workspace Platform |
| WebProxy | Part of WSP responsible for proxying communication from Receiver for Web to WSP. |
| SSO Proxy | Part of WSP responsible for converting from browser cookies to DSAuthT. |

In some implementations, authentication in the browser 204 may utilize the WebProxy 283 and an SSO Proxy (in WSP). SSO Proxy 288 performs a conversion from browser cookies to DSAuthT. For example, the LeaseCallHome API will be handled by SSO Proxy and redirected via API Gateway to CLIS 258. In the example illustrated in FIG. 8 and FIGS. 12A, 12B and 13, however, the authentication manager 284 implemented in the browser 204 helps perform these functions, as well as provide feature and capability sharing so that published resources will remain "green" or up to date.

In this configuration, the browser extension 210 autonomously determines the start of an authentication flow based on URL monitoring of auth-related URLs and state transitions. That is, the browser extension 210 knows the URLs associated with initiation and completion of the particular authentication flow, so that when the browser 204 accesses these particular URLs it knows the authentication flow has begun/concluded. By way of example, the Citrix Identity Platform (CIP) could be integrated with the 3rd party authentication provider Okta. The authentication itself would be done by Okta, by displaying an embedded Web UI (from Okta, possibly with customer branding). This assumes a trust relationship between CIP and Okta (e.g., via SAML). The browser extension 210 (with the required privileges) can monitor the successive URLs from Okta that leads to a successful authentication (or the opposite, and then switch to the cached asset UI used in offline mode). The browser extension can also monitor the duration of the Okta request(s) and rely on a predefined timeout to decide to cancel the authentication sequence. In accordance with another example, the browser extension 210 could be notified by the Workspace UI prior to starting an authentication flow, for example.

Figure 12A:
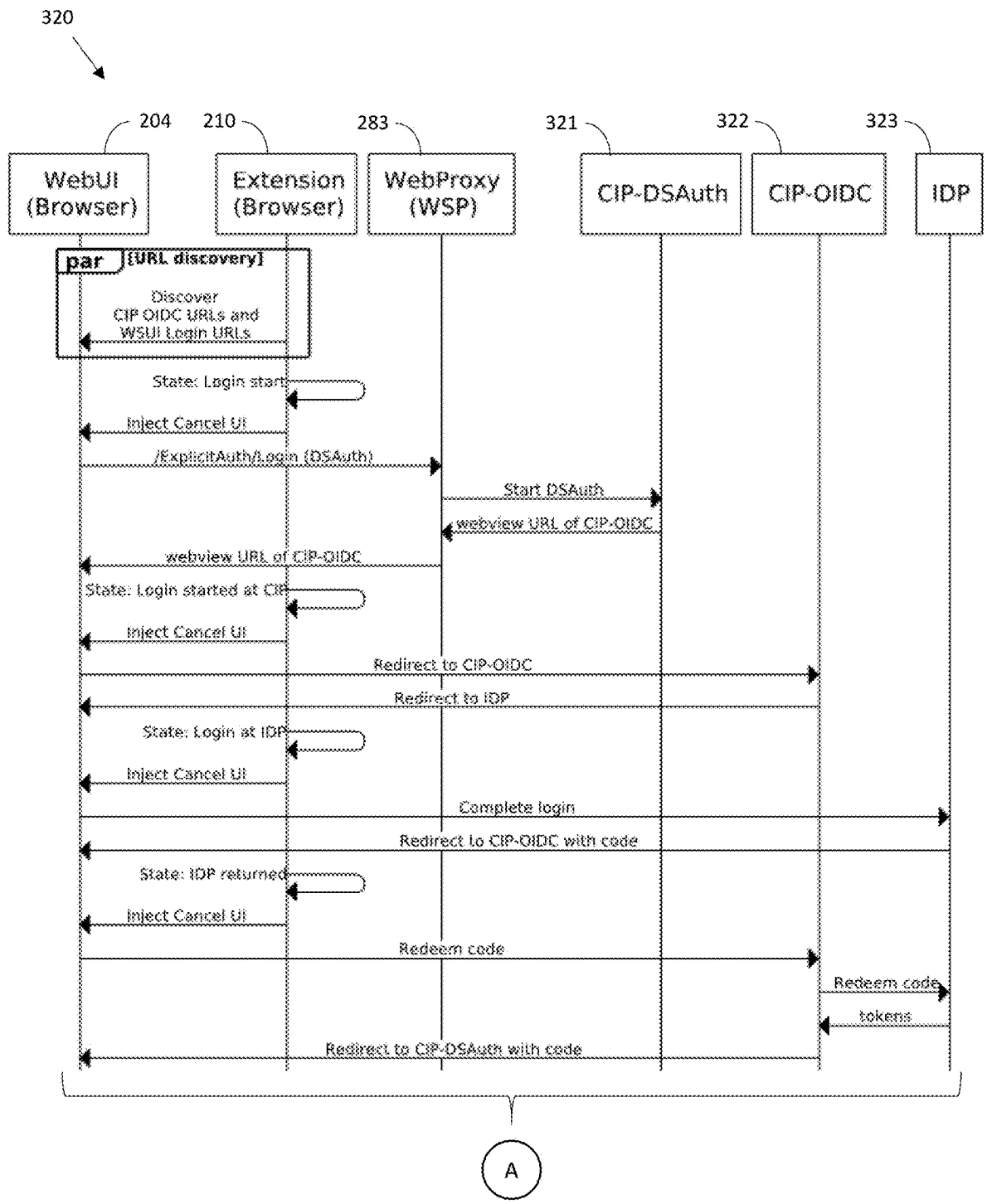
FIGS. 12A and 12B are a sequence diagram illustrating a cancellable Web authentication flow for the system of FIG. 8 in accordance with an example implementation.
Figure 12B:
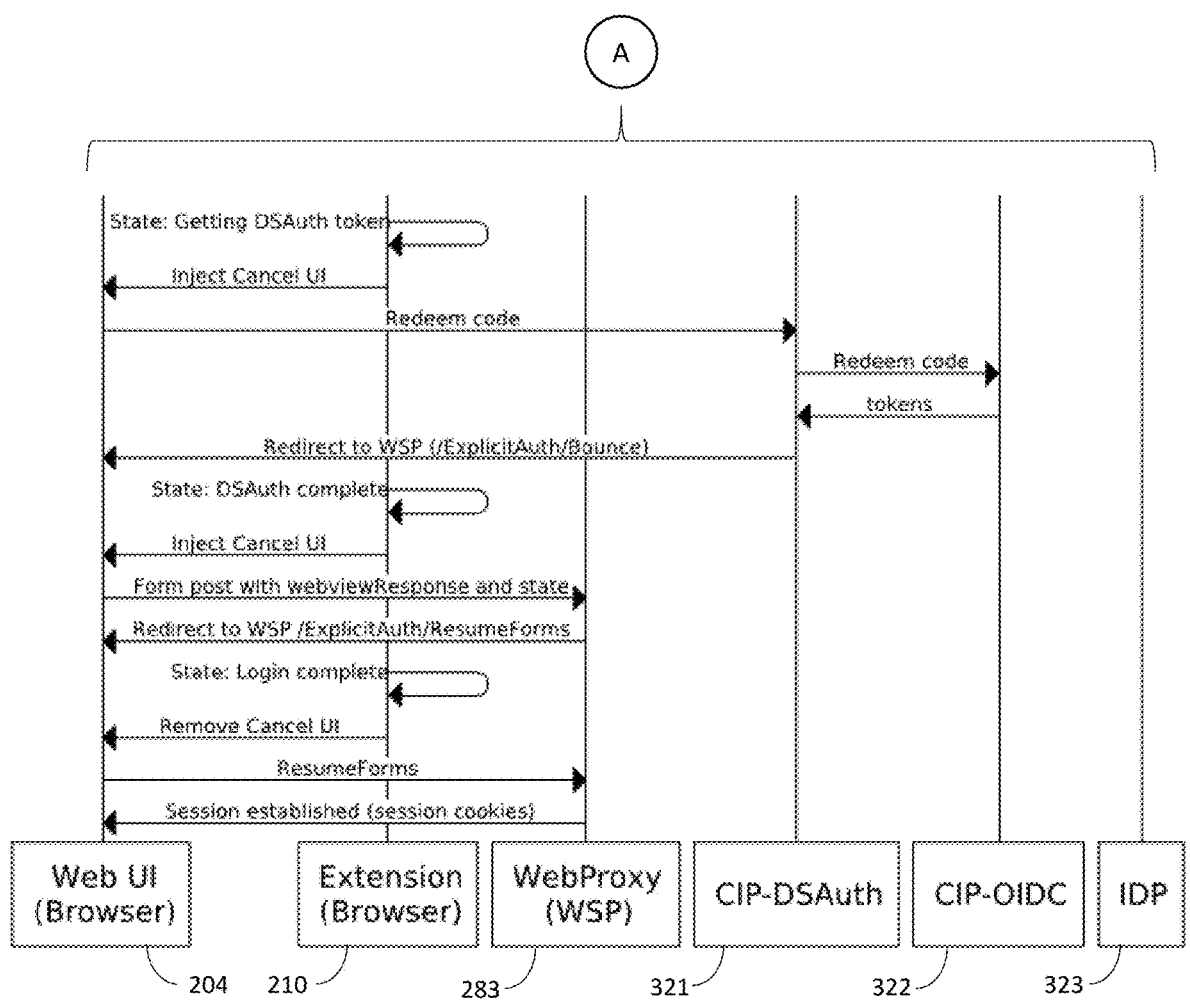
Figure 13:
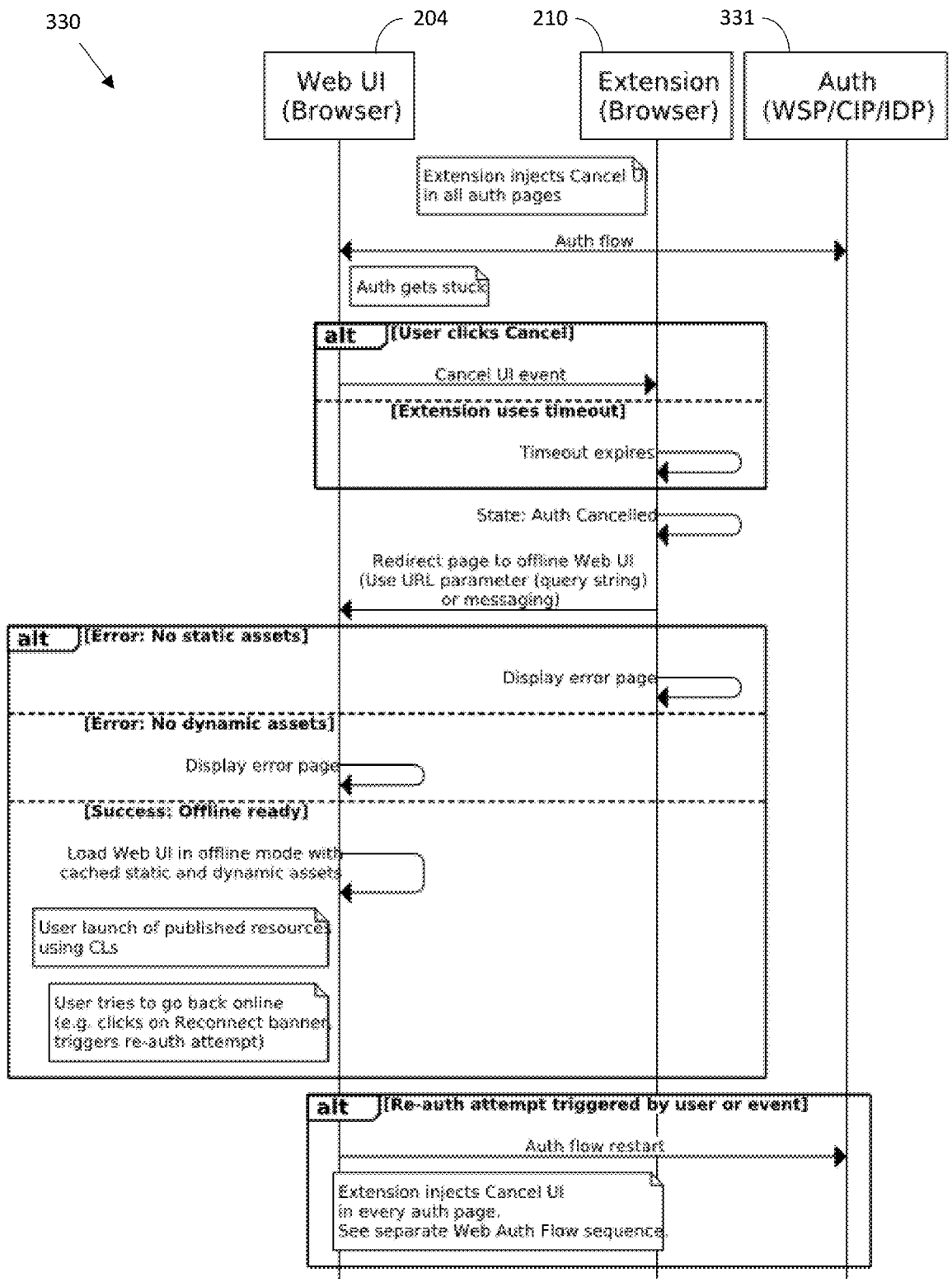
FIG. 13 is a sequence diagram illustrating how the browser extension of the system of FIG. 8 responds to cancellation events in an example implementation.

As seen in the sequence flow diagram 320 FIGS. 12A-12B, the browser extension 210 may perform a URL discovery where it learns what URLs to monitor for the authentication flow (e.g., from the CWA instance 208) and begins monitoring the browser 204 accordingly. In parallel, the browser extension 210 may insert or inject a "Cancel" or "Home" button into WSUI. The browser extension 210 becomes a "watchdog" and monitors URLs loaded in the tab (or, alternatively, waits to be notified of events). The browser extension 210 monitors for cancel events (e.g., the user clicking on the cancel button 297), and/or an optional authentication timeout period (if defined). By way of example, the authentication time period may correspond to a maximum authentication time expected. It should be noted that the browser extension 210 may be configured for different URLs (that is, for different authentication sequences) or modes of operation. Moreover, the UI and banner 296/button 297 (or other UI elements) may be also configurable and brandable for use with different organizations or enterprises.

As the authentication flow sequence begins, the Web proxy 283 starts the DSAuth process with the CIP 321, and provides the Web view URL for the CIP to the browser 204. This redirects the browser to CIP-OIDC 322, which is in turn followed by a redirect to an IDP 323. The CIP-OIDC 322 redeems a code from the browser 210 with the IDP 323, which returns the appropriate tokens to the CIP-OIDC. The CIP-OIDC 322 redirects the browser 204 to the CIP-DSAuth 322 with a code that the browser then redeems to the CIP-DSAuth (FIG. 12B). A similar code redemption or exchange is performed between the CIP-DSAuth 322 and CIP-OIDC 322 to that described above, and the CIP-DS-Auth redirects the browser 204 to the Web Proxy 283.

It should be noted that as each of the above-noted redirect operations occurs, the browser extension 210 is monitoring the then current state of the authentication processes (login started, login at IDP, IDP returned, getting DSAuth token, DSAuth complete) based upon the URL to which the browser 204 is redirected. Moreover, the browser extension 210, in some examples, may continue to inject the cancel button 297 (or other appropriate UI element) after each successive redirect until the browser has completed a form post and the Web proxy 283 redirects the browser 204 with explicit authentication to proceed. At this point, the browser extension 210 determines that the login is completed and it removes the cancel button 297 from the UI, and the session is established.

More particularly, the browser extension 210 autonomously determines if the authentication is successful based on URL monitoring of auth-related URLs and state transitions (or, alternatively, by having the WSUI notify the browser extension that login has completed), as discussed above. The browser extension 210, in some examples, may then remove the button popup window 296 and cancel button 297 from the WSUI and stop being a watchdog, as noted above. However, if the user clicks the button 297 and/or auth timeout occurs, the browser extension 210 loads the resources page 298 in offline mode, i.e., from cached assets, as discussed above with reference to FIG. 11. Offline mode could be requested either via URL parameter (query string) or via messaging, for example.

In an FTU case (meaning no static assets (app code) are available), the browser extension 210 may display an embedded/preconfigured error page. For example, in the FTU case there may not even be an error WSUI page available to show. Furthermore, if no dynamic assets (published resources) are available, the WSUI may display an error page.

Various other approaches may be used for presenting a cancellation or redirection element to a user besides the embedded HTML banner 296 and button 297. One such approach is showing some or all of the authentication UI in an iFrame, although some third party IDPs will block using an iFrame for authentication (for security reasons). Another approach involves using a popup box to show the authentication UI, which allows the user to close it/cancel it. One benefit of this approach is that it may be implemented without the browser extension 210, and may be used in a "pure browser" case where no CWA instance 208 is installed. However, popups may be blocked in some browser configurations, and a blocked popup can automatically result in WSUI operating in offline mode. In the case of an FTU, Auth UI needs to be shown in online conditions. As such, WSUI could be instrumented to use the regular Auth flow during FTU, but attempt a pop-up subsequently. In some cases, a combination of approaches could be used, such as the above-described authentication flow during FTU, but subsequently attempting a popup.

In some cases, the browser extension 210 may operate as a watchdog coordinating with CIP-DSAuth 321. The authentication page may issue a ticket and give it to the browser extension 210, which becomes a watchdog and talks to CIP-DSAuth 321 to find out if authentication is successful. If authentication is not successful after a timeout, the browser extension 210 loads the WSUI in offline mode.

In some embodiments, microapp-related authentication flows can be made cancellable in order to provide resiliency features and improved UX. Typically, with microapp actions, a Service Provider (SP) initiated flow is used, where the microapp action can be executed automatically once after authentication is complete. Many System of Record (SoR) providers do not support SP initiated flow. IDP initiated flow is typically supported by more apps, but the UX may be sub-optimal.

An example cancellation of Web authentication flow using the browser extension 210 as a watchdog is now described with reference to the flow diagram 330 of FIG. 13. When the browser extension 210 detects the beginning of the authentication flow between the browser and an authentication entity 331 (e.g., WSP 283, CIP-DSAuth 321/CIP-OIDC 322, IDP 323, etc.), it may inject the banner 296/cancel button 297 into the authentication UI 295, in some examples. In instances in which a timeout of the process triggers a redirection, banner 296/cancel button 297 may not be provided. When the authentication gets stuck, the user may click the cancel button 297 (or a timeout occurs in some embodiments) which indicates a cancellation (or timeout) state to the browser extension 210. The browser extension 210 then redirects the browser 204 to the offline Web UI, which may be done via a URL parameter such as a query string or messaging, for example. If no static or dynamic assets are available (e.g., FTU), the browser 204 displays an error page. Otherwise, the resource page 298 can be displayed with cached static and dynamic assets. The user may then launch available published resources using the cached static/dynamic assets, and may optionally re-attempt authentication at a later time.

When the re-authentication attempt is made, the browser 204 once again initiates the authentication flow with the authentication entity 331, and the browser extension 210 again injects a cancellation UI element (e.g., the banner 296/button 297) in each page in the authentication sequence until the authentication is successfully completed, as discussed further above. It should be noted that, in some embodiments, the re-authentication process may be performed automatically without user input. For example, the browser 204 may attempt authentication after a specified period. In some embodiments, health checkers may be employed to determine when authentication resources are back online as well.

As an alternative to SP and IDP initiated flows, the above-described approach utilizing the browser extension 210 may be used to improve authentication flow and UX with microapps. More particularly, the browser extension 210 can be leveraged to make the auth flow with microapps both simpler and more reliable than the SP and IDP approaches. In accordance with one implementation example, a user would like to write a JIRA comment in a story using Workspace microapp actions but has not yet logged in, i.e., approved Workspace to access JIRA. Workspace starts an IDP initiated flow, which takes the user to the JIRA home page. However, WSUI needs to execute an action, e.g., adding a JIRA comment in this case.

Utilizing the browser extension 210 approach, the extension flow proceeds as follows:
1) WSUI (browser 204) notifies the browser extension 210 that it is going to trigger an action in a popup. WSUI provides two URLs: one to login and a second one to execute the action.
2) The browser extension 210 monitors the URLs loaded inside the popup (IDP, SoR pages).
3) Once login is successful, the browser extension 210 notifies WSUI, e.g., that a default JIRA dashboard has been loaded.
4) WSUI via the browser extension 210 will then redirect the popup URL to execute the action.
An admin can configure the expected landing pages so that login detection is accurate. Even if not configured, domains of IDP/SoR can be compared with the loaded URL to guess the login state.

In addition to JIRA, this approach can be leveraged in different flows where third party content is loaded using a series of web page redirects. Errors in intermediate pages can be handled gracefully by restarting the flow or by detecting user inactivity and taking (redirecting) the user back to Workspace or other home page with meaningful errors. For example, this could be done for approvals, expense reports, banking/credit card transactions, etc.

Figure 14:
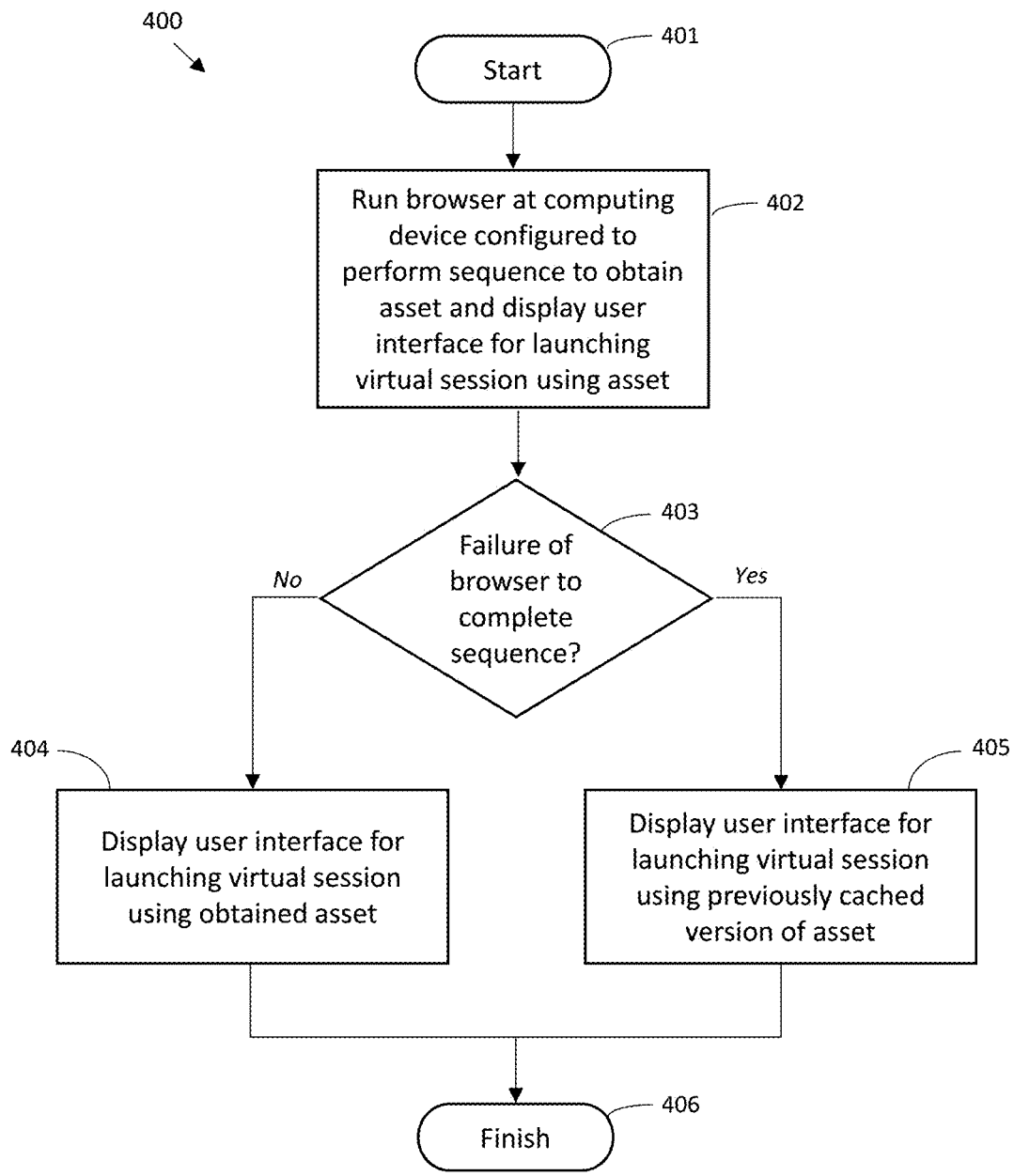
FIG. 14 is a flow diagram illustrating example method aspects associated with the system of FIG. 6.

Referring additionally to the flow diagram 400 of FIG. 14, a related method begins at Block 401 and illustratively includes running a browser 204 at a computing device 201 configured to perform a sequence to obtain an asset and display a user interface 205 for launching a virtual session using the asset, at Block 402. The method further illustratively includes running code (e.g., browser extension) 210 at the computing device 201 configured to determine a failure of the browser 204 to complete the sequence, at Block 403, and cause the browser to display the user interface 205 (e.g., in an offline mode) for launching the virtual session using a previously cached version of the asset responsive to the failure of the browser to complete the sequence (Block 405). Otherwise, the browser 204 is able to display the user interface for launching the virtual session (e.g., in an online mode) using the newly obtained version of the asset (Block 404), as discussed further above. The method of FIG. 14 illustratively concludes at Block 406.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing device comprising:
a memory and a processor configured to cooperate with the memory to run a browser configured to perform a sequence to obtain an asset comprising a connection lease, and display a user interface for launching a virtual session using the asset, and code configured to:
determine a failure of the browser to complete the sequence; and
cause the browser to display the user interface for launching the virtual session using a previously cached version of the asset responsive to the failure of the browser to complete the sequence;
wherein the code is configured to cause the browser to display an input element, and detect the failure of the browser to complete the sequence based upon receipt of input via the input element.

2. The computing device of claim 1 wherein the code is configured to determine initiation of the sequence based upon an address loaded by the browser; and wherein the code determines the failure of the browser to complete the sequence responsive to determining initiation of the sequence.

3. The computing device of claim 1 wherein the browser is configured to perform the sequence at a first Web page, and display a second Web page in the user interface for launching the virtual session; and wherein the code is configured to redirect the browser to the second Web page responsive to determining the failure of the browser to complete the sequence.

4. The computing device of claim 1 wherein the input element comprises a cancel button.

5. The computing device of claim 1 wherein the code is configured to detect the failure of the browser to complete the sequence based upon a timeout period.

6. The computing device of claim 1 wherein the sequence being one in which to authenticate a user to enable the user to access a resource hosted on another computing device.

7. The computing device of claim 1 wherein the virtual session comprises one or both of an application session and a microapp session.

8. A method comprising:
running a browser at a computing device configured to perform a sequence to obtain an asset comprising a connection lease, and display a user interface for launching a virtual session using the asset; and
running code at the computing device configured to:
determine a failure of the browser to complete the sequence; and
cause the browser to display the user interface for launching the virtual session using a previously cached version of the asset responsive to the failure of the browser to complete the sequence;
wherein the code is configured to cause the browser to display an input element, and detect the failure of the browser to complete the sequence based upon receipt of input via the input element.

9. The method of claim 8 wherein the code is configured to determine initiation of the sequence based upon an address loaded by the browser; and wherein the code determines the failure of the browser to complete the sequence responsive to determining initiation of the sequence.

10. The method of claim 8 wherein the browser is configured to perform the sequence at a first Web page, and display a second Web page in the user interface for launching the virtual session; and wherein the code is configured to redirect the browser to the second Web page responsive to determining the failure of the browser to complete the sequence.

11. The method of claim 8 wherein the input element comprises a cancel button.

12. A non-transitory computer-readable medium having computer-executable instructions for causing a computing device to perform steps comprising:
running a browser configured to perform a sequence to obtain an asset comprising a connection lease, and display a user interface for launching a virtual session using the asset; and
running code configured to:
determine a failure of the browser to complete the sequence; and
cause the browser to display the user interface for launching the virtual session using a previously cached version of the asset responsive to the failure of the browser to complete the sequence;
wherein the code is configured to cause the browser to display an input element, and detect the failure of the browser to complete the sequence based upon receipt of input via the input element.

13. The non-transitory computer-readable medium of claim 12 wherein the code is configured to determine initiation of the sequence based upon an address loaded by the browser; and wherein the code determines the failure of the browser to complete the sequence responsive to determining initiation of the sequence.

14. The non-transitory computer-readable medium of claim 12 wherein the browser is configured to perform the sequence at a first Web page, and display a second Web page in the user interface for launching the virtual session; and wherein the code is configured to redirect the browser to the second Web page responsive to determining the failure of the browser to complete the sequence.

15. The non-transitory computer-readable medium of claim 12 wherein the input element comprises a cancel button.

\* \* \* \* \*